United States Patent [19]
Yoshihashi et al.

[11] Patent Number: 5,758,719
[45] Date of Patent: Jun. 2, 1998

[54] SEPARATE-TYPE AIR CONDITIONER

[75] Inventors: Makoto Yoshihashi; Akira Takamori; Natsuko Nishigaki; Motoo Sano; Motoshige Satou; Yoshinori Tanikawa, all of Shizuoka, Japan

[73] Assignee: Mitsubishi Denki Kabushiki Kaisha, Tokyo, Japan

[21] Appl. No.: 636,757

[22] Filed: Apr. 19, 1996

Related U.S. Application Data

[62] Division of Ser. No. 314,621, Sep. 29, 1994.

[30] Foreign Application Priority Data

| Sep. 29, 1993 | [JP] | Japan | 5-242488 |
| Jul. 28, 1994 | [JP] | Japan | 6-175885 |

[51] Int. Cl.⁶ ............................................. F28F 19/01
[52] U.S. Cl. ............ 165/119; 165/122; 165/DIG. 326; 55/269; 55/500
[58] Field of Search .................. 55/269, 497, 500, 55/511; 165/119, 122, DIG. 326

[56] References Cited

U.S. PATENT DOCUMENTS 3,408,438  10/1968  Staunton ......................... 55/500 X

FOREIGN PATENT DOCUMENTS

| 223216 | 6/1985 | Germany | 165/119 |
| 29519 | 1/1990 | Japan | 165/119 |
| 59327 | 3/1991 | Japan | 165/119 |
| 110327 | 5/1991 | Japan | 165/119 |
| 106327 | 4/1992 | Japan | 165/119 |
| 68921 | 6/1992 | Japan | 165/122 |
| 8316 | 2/1993 | Japan | 165/122 |
| 99448 | 4/1993 | Japan | 165/119 |
| 99449 | 4/1993 | Japan | 165/119 |
| 99450 | 4/1993 | Japan | 165/119 |
| 149571 | 6/1993 | Japan | 165/119 |

*Primary Examiner*—Leonard R. Leo
*Attorney, Agent, or Firm*—Oblon, Spivak, McClelland, Maier & Neustadt, P.C.

[57] ABSTRACT

The invention relates to a separation-type air conditioner capable of increasing the heat exchanging area of a compact indoor unit and of effecting high-performance heat exchange, and particularly employable as a high-performance yet compact indoor unit whose height is low. A front heat exchanger having a configuration in which an upper edge portion and a lower edge portion are respectively made to recede is disposed in an indoor unit. In addition, a rear heat exchanger separate from the front heat exchanger is disposed on the rear surface side of the front heat exchanger. Consequently, it is possible to increase the heat exchanging area in an indoor unit having the same height, and improve the heat exchanging capacity.

12 Claims, 10 Drawing Sheets

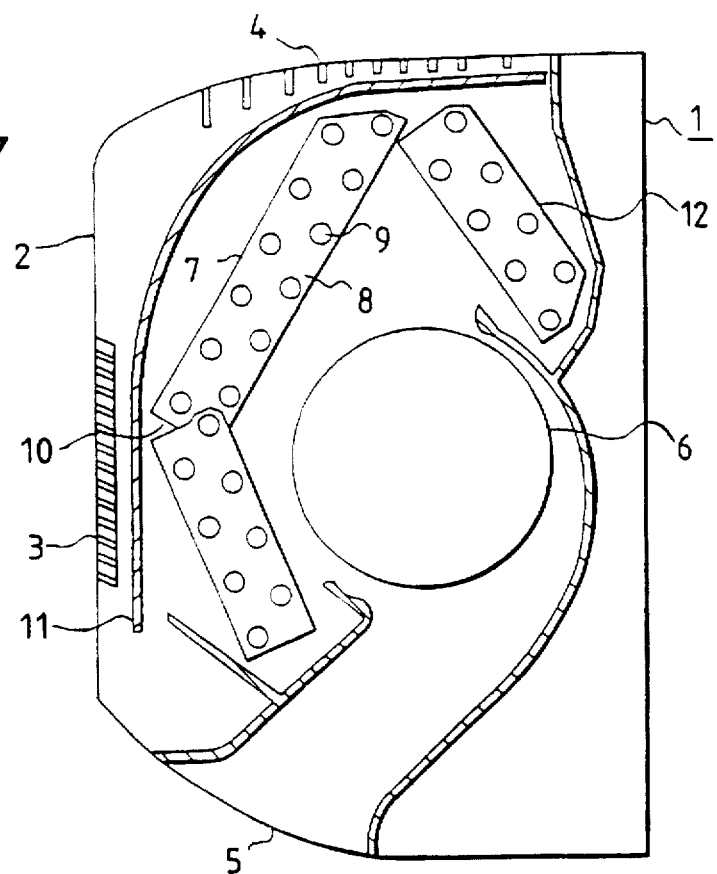
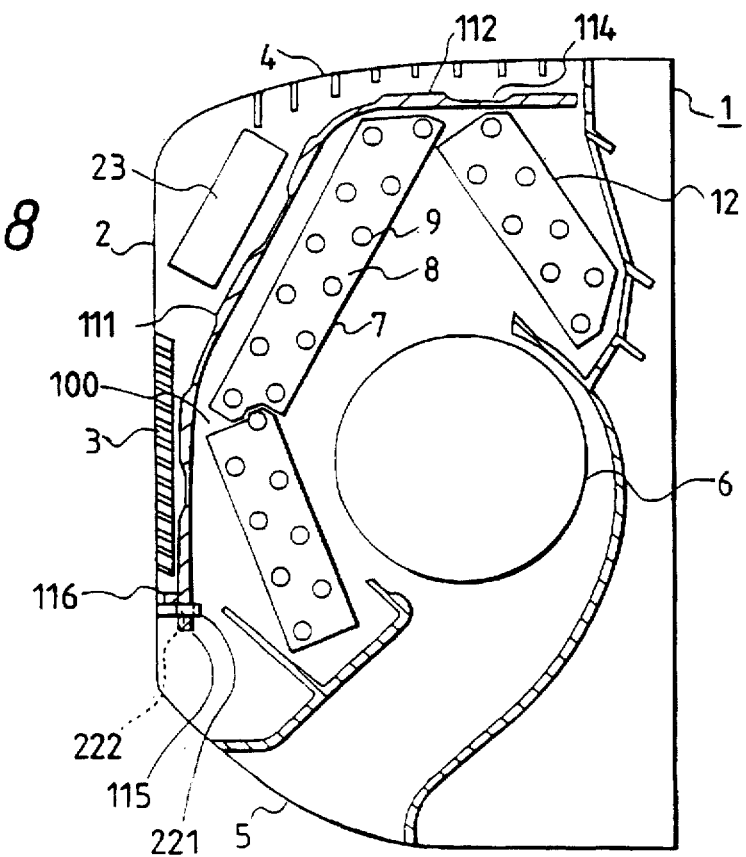

SEPARATE-TYPE AIR CONDITIONER

This is a division of application Ser. No. 08/314,621 filed on Sep. 29, 1994.

BACKGROUND OF THE INVENTION

The present invention relates to a separate-type air conditioner in which an indoor unit is separated.

FIG. 21 is a cross-sectional view illustrating a conventional separate-type air conditioner shown in, for instance, Japanese Patent Application Laid-Open No. 118430/1985. In the drawing, reference numeral (1) denotes a casing of an indoor unit of a separate-type air conditioner; (2), a front panel at the front surface of the casing (1); (3), a front air inlet provided in the front surface of the front panel (2); (4), an upper air inlet provided in the upper surface of the front panel (2); (5), an air outlet provided at the underside of the front panel (2); and (6), a cross flow fan provided in the casing (1) and disposed at a position corresponding to the air outlet (5).

Numeral (7) denotes a front heat exchanger disposed in the casing (1) and having an upper edge portion and a lower edge portion which are respectively formed in a receding manner and are disposed at positions corresponding to the front air inlet (3) and the upper air inlet (4), respectively. Numeral (8) denotes fins which are formed of a multiplicity of aluminum plates which are juxtaposed horizontally in a mutually spaced-apart relationship, their plate surfaces being arranged along the blowing direction of the cross flow fan (6). Numeral (9) denotes hair pin tubes of the front heat exchanger (7), the hair pin tubes (9) being formed by a plurality of heat exchanging pipes penetrating the fins (8).

Numeral (10) denotes notched portions which are formed on the front and back sides of each fin (8) at a longitudinally intermediate position thereof, and numeral (11) denotes a filter disposed in front of the front heat exchanger (7).

The conventional separate-type air conditioner is arranged as described above, and as the cross flow fan (6) is operated, air in the room to be air-conditioned is sucked through the front air inlet (3) and the upper air inlet (4) of the casing (1), and the dust in the air is removed by the filter (11). Then, heat exchange is effected by the front heat exchanger (7), and conditioned air is supplied through the air outlet (5) to the room to be air-conditioned.

In addition, FIG. 22 is an enlarged view corresponding to a portion XXII of FIG. 21 above, and illustrates another conventional separate-type air conditioner. In the drawing, reference numeral (81) denotes a bent connecting portion of the fins (8), and (82) denotes an opening which is formed on the front side of the bent portion as the fins (8) are bent at the bent connecting portion (81).

In the above-described conventional separate-type air conditioners, since the upper edge portion and the lower edge portion are respectively formed in a receding manner, and the front heat exchanger (7) opposing both the front air inlet (3) and the upper air inlet (4) is provided, the height of the casing (1) is made low, and the indoor unit is made compact. However, there has been a problem in that it is difficult to sufficiently increase the heat exchanging area, making it difficult to obtain high performance of heat exchange.

In addition, since the filter (11) formed with a uniform thickness is disposed in front of the front heat exchanger (7) in a curved manner, there has been a problem in that a complicated procedure is involved. Furthermore, there has been a problem in that the air, which is sucked into the cross flow fan (6) through the openings (82) formed on the front sides of the bent portions of the fins (8), is difficult to come into contact with the fins (8), so that dehumidification is insufficient and dew condensation occurs on the cross flow fan (6).

SUMMARY OF THE INVENTION

The present invention has been devised to overcome the above-described problems, and its primary object is to obtain a separation-type air conditioner capable of easily increasing the heat exchanging area of a compact indoor unit, thereby effecting high-performance heat exchange. In addition, a second object is to obtain a separation-type air conditioner capable of easily mounting and demounting a dust collecting means. Furthermore, a third object is to obtain a separation-type air conditioner where cavities formed in bent portions of the fins are small.

In order to attain the above-noted and other objects, the present invention provides a separate-type air conditioner which comprises: a front heat exchanger disposed in an indoor unit and having an upper edge portion and a lower edge portion respectively formed in a receding manner; and a rear heat exchanger formed separately from the front heat exchanger and disposed on a rear side of the front heat exchanger.

In the separation-type air conditiner of the present invention arranged as described above, it is possible to increase the heat exchanging area in an indoor unit having the same height, and improve the heat exchanging capacity.

The present invention further provides separate-type air conditioner which comprises: a front heat exchanger disposed in an indoor unit and having an upper edge portion and a lower edge portion respectively formed in a receding manner; and a rear heat exchanger formed separately from the front heat exchanger and disposed on a rear side of the front heat exchanger such that an upper edge of the rear heat exchanger is disposed in opposing relation to an upper edge of the front heat exchanger with a gap therebetween, while a lower edge side of the rear heat exchanger is disposed in such a manner as to be inclined in a direction away from the front heat exchanger.

In the separation-type air-conditioner of the present invention arranged as described above, it is possible to increase the heat exchanging area in an indoor unit having the same height, and improve the heat exchanging capacity. Furthermore, it is possible to reduce nonuniformity in the velocity of a wind occurring in vicinities of upper portions of the front heat exchanger and the rear heat exchanger.

The present invention further provides a separate-type air conditioner which comprises: a front heat exchanger disposed in an indoor unit and having an upper edge portion and a lower edge portion respectively formed in a receding manner; and a rear heat exchanger formed separately from the front heat exchanger and disposed on a rear side of the front heat exchanger, fins of the rear heat exchanger being juxtaposed at intervals greater than those of fins of the front heat exchanger.

In the separation-type air-conditioner of the present invention arranged as described above, it is possible to increase the heat exchanging area in an indoor unit having the same height, and improve the heat exchanging capacity. Furthermore, after the wind velocity is uniformalized at the front surfaces of the front heat exchanger and the rear heat exchanger, air passes through the cross flow fan and is blown out from the air outlet.

The present invention further provides a separate-type air conditioner which comprises: a front heat exchanger disposed in an indoor unit and having an upper edge portion and a lower edge portion respectively formed in a receding manner; a rear heat exchanger formed separately from the front heat exchanger and disposed on a rear side of the front heat exchanger; and stationary casing blades which form a plurality of split-nozzle blow paths for uniformalizing a rate of air flowing into the rear heat exchanger.

In the separation-type air conditioner of the present invention arranged as described above, it is possible to increase the heat exchanging area in an indoor unit having the same height, and improve the heat exchanging capacity. Furthermore, the stationary casing blades make it possible to reduce the rate of air flowing through an upper portion of the rear heat exchanger and increase the rate of air flowing through a lower portion thereof, thereby uniformalizing the rate of air flowing into the rear heat exchanger.

The present invention further provides a separate-type air conditioner which comprises: a front heat exchanger disposed in an indoor unit and having an upper edge portion and a lower edge portion respectively formed in a receding manner; a rear heat exchanger formed separately from the front heat exchanger and disposed on a rear side of the front heat exchanger; and a guide blade arranged in such a manner as to be suspended downward with an upper edge thereof disposed in proximity to opposing portions of the front heat exchanger and the rear heat exchanger, a lower edge portion thereof being bent toward the front heat exchanger.

In the separation-type air conditioner according to the present invention arranged as described above, it is possible to increase the heat exchanging area in an indoor unit having the same height, and improve the heat exchanging capacity. Furthermore, the guide blade makes it possible to eliminate a disturbance caused by the confluence of air flowing into the cross flow fan, thereby making it possible to eliminate a portion where the wind velocity changes extremely.

The present invention further provides a separate-type air conditioner which comprises: a front heat exchanger disposed in an indoor unit and having an upper edge portion and a lower edge portion respectively formed in a receding manner; a rear heat exchanger formed separately from the front heat exchanger and disposed on a rear side of the front heat exchanger; and an arcuate curled portion formed on a blade negative-pressure surface of a blade of a cross flow fan of the indoor unit at a fan outer-peripheral blade end of the blade.

In the separation-type air conditioner of the present invention arranged as described above, it is possible to increase the heat exchanging area in an indoor unit having the same height, and improve the heat exchanging capacity. Furthermore, although the air current which passes the blade for the first time flows round to the blade negative-pressure surface side at a forward edge of the blade, the occurrence of a release at that time can be suppressed by the arcuate curved portion of the blade of the cross flow fan.

The present invention further provides a separate-type air conditioner which comprises: a front heat exchanger disposed in an indoor unit and having an upper edge portion and a lower edge portion respectively formed in a receding manner; a rear heat exchanger formed separately from the front heat exchanger and disposed on a rear side of the front heat exchanger; and an upper air inlet formed by a plurality of mutually spaced apart openings and disposed in an upper surface of the indoor unit such that intervals between adjacent ones of the openings at a portion of the upper air inlet which is close to a front panel of the indoor unit and at a portion thereof which is remote from the front panel are arranged to be greater than intervals between adjacent ones of the openings at an intermediate portion of the upper air inlet.

In the separation-type air-conditioner of the present invention arranged as described above, it is possible to increase the heat exchanging area in an indoor unit having the same height, and improve the heat exchanging capacity. Furthermore, since intervals between adjacent openings at positions close to respective edge portions of the upper air inlet are arranged to be greater than intervals between adjacent openings at the intermediate portion of the upper air inlet, after the flow rate of air, which has flown in, is uniformalized at the front surface of the heat exchanger, the air passes through the cross flow fan and is blown out through the air outlet.

In addition, each of the separate-type air conditioners as described above may further comprise: a fan disposed between the front heat exchanger and the rear heat exchanger; and a front panel in which a front air inlet is provided at a position corresponding to the lower edge portion of the front heat exchanger and an upper air inlet is provided at a position corresponding to upper edge portions of the front heat exchanger and the rear heat exchanger. In this case, air is sucked in by the fan disposed between the front heat exchanger and the rear heat exchanger, through the front air inlet provided in the front panel at a position corresponding to the lower edge portion of the front heat exchanger and through the upper air inlet provided therein at a position corresponding to upper edge portions of the front heat exchanger and the rear heat exchanger. Moreover, the separate-type air conditioner may further be provided with the upper air inlet having an area of openings greater than an area of openings in the front air inlet so that air is sucked in through the upper air inlet having an area of openings greater than an area of openings in the front air inlet.

The present invention further provides a separate-type air conditioner which comprises: a heat exchanger disposed in an indoor unit; and a plate-like dust collecting means disposed in such a manner as to cover the heat exchanger, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other.

In the separation-type air-conditioner of the present invention arranged as described above, the plate-like dust collecting means, which is provided with the dust-collecting portions and the thin-walled portions for bending arranged in the form of strips, is mounted by being bent at the thin-walled portions in such a manner as to cover the heat exchanger.

The present invention further provdes a separate-type air conditioner which comprises: a heat exchanger disposed in an indoor unit; and a plate-like dust collecting means disposed in such a manner as to cover the heat exchanger and arranged along a front air inlet, an upper air inlet, and a rear air inlet of a casing in which the heat exchanger is disposed, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other.

In the separation-type air-conditioner of the present invention arranged as described above, the plate-like dust collecting means, which is provided with the dust-collecting portions and the thin-walled portions for bending arranged in the form of strips, is mounted by being bent at the thin-walled portions in such a manner as to cover the heat exchanger, and is arranged along the front air inlet, the upper air inlet, and the rear air inlet of the casing.

The present invention further provides a separate-type air conditioner which comprises: a heat exchanger disposed in an indoor unit; and a plate-like dust collecting means disposed in such a manner as to cover the heat exchanger and conform to a configuration of the heat exchanger, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other.

In the separation-type air-conditioner of the present invention arranged as described above, the plate-like dust collecting means, which is provided with the dust-collecting portions and the thin-walled portions for bending arranged in the form of strips, is mounted by being bent at the thin-walled portions in such a manner as to cover the heat exchanger and conform to the configuration of the heat exchanger.

The present invention further provdes a separate-type air conditioner which comprises: a heat exchanger disposed in an indoor unit; a plate-like dust collecting means disposed in such a manner as to cover the heat exchanger and arranged along a front air inlet, an upper air inlet, and a rear air inlet of a casing in which the heat exchanger is disposed, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other; and a guide piece disposed at a corner portion within the casing.

In the separation-type air-conditioner of the present invention arranged as described above, the plate-like dust collecting means, which is provided with the dust-collecting portions and the thin-walled portions for bending arranged in the form of strips, is mounted by being bent at the thin-walled portions in such a manner as to cover the heat exchanger, and is arranged along the front air inlet, the upper air inlet, and the rear air inlet of the casing by being guided to a predetermined position by the guide piece.

The present invention further provdes a separate-type air conditioner which comprises: a heat exchanger disposed in an indoor unit; a plate-like dust collecting means disposed in such a manner as to cover the heat exchanger and arranged along a front air inlet, an upper air inlet, and a rear air inlet of a casing in which the heat exchanger is disposed, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other; and a guide rail provided in the casing for disposing the dust collecting means at a predetermined position by engaging an end portion of the dust collecting means.

In the separation-type air-conditioner of the present invention arranged as described above, the plate-like dust collecting means, which is provided with the dust-collecting portions and the thin-walled portions for bending arranged in the form of strips, is disposed at a predetermined position by the guide rail provided in the casing, the dust collecting means being mounted by being bent at the thin-walled portions in such a manner as to cover the heat exchanger and being arranged along the front air inlet, the upper air inlet, and the rear air inlet of the casing.

The present invention further provides a separate-type air conditioner which comprises: a heat exchanger disposed in an indoor unit; a plate-like dust collecting means disposed in such a manner as to cover the heat exchanger and conform to a configuration of the heat exchanger, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other; and a guide rail provided in the casing for disposing the dust collecting means at a predetermined position by engaging an end portion of the dust collecting means.

In addition, in the separation-type air conditioner of the present invention arranged as described above, the plate-like dust collecting means, which is provided with the dust-collecting portions and the thin-walled portions for bending arranged in the form of strips, is disposed at a predetermined position by the guide rail provided in the casing, the dust collecting means being mounted by being bent at the thin-walled portions in such a manner as to cover the heat exchanger and conform to the configuration of the heat exchanger.

The present invention further provdes a separate-type air conditioner which comprises: a heat exchanger disposed in an indoor unit; and a plate-like dust collecting means disposed in such a manner as to cover the heat exchanger and arranged along a front air inlet, an upper air inlet, and a rear air inlet of a casing in which the heat exchanger is disposed, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other, the thin-walled portions being disposed at positions corresponding to corner portions within the casing.

In the sepration-type air-conditioner of the present invention arranged as described above, the plate-like dust collecting means, which is provided with the dust-collecting portions and the thin-walled portions for bending arranged in the form of strips, is mounted by being bent at the thin-walled portions disposed at positions corresponding to corner portions within the casing, in such a manner as to cover the heat exchanger, and is arranged along the front air inlet, the upper air inlet, and the rear air inlet of the casing.

The present invention further provides a separate-type air conditioner which comprises: a heat exchanger disposed in an indoor unit; and a plate-like dust collecting means disposed in such a manner as to cover the heat exchanger and conform to a configuration of the heat exchanger, the dust collecting means being provided with net-like dust-collecting portions having a dust-collecting function and with thin-walled portions for bending which are provided in the form of strips, have their longitudinal directions arranged horizontally, and are disposed in parallel in spaced-apart relation to each other, the thin-walled portions being disposed at positions corresponding to bent corner portions in the configuration of the heat exchanger.

In the separation-type air-conditioner of the present invention arranged as described above, the plate-like dust collecting means, which is provided with the dust-collecting portions and the thin-walled portions for bending arranged in the form of strips, is mounted by being bent at the thin-walled portions disposed at positions corresponding to bent corner portions in the configuration of the heat exchanger, in such a manner as to cover the heat exchanger and conform to the configuration of the heat exchanger.

In addition, each of the separate-type air conditioners as described above may be provided with the heat exchanger comprising a front heat exchanger having an upper edge portion and a lower edge portion respectively formed in a receding manner and a rear heat exchanger disposed on a rear side of the front heat exchanger. In this case, heat exchange is effected by the heat exchanger comprising the front heat exchanger having an upper edge portion and a lower edge portion respectively formed in a receding manner and the rear heat exchanger disposed on the rear side of the front heat exchanger. Moreover, the separate-type air conditioner may further comprise: dust collecting means for covering the heat exchanger including at least a half of the rear heat exchanger so that dust is collected from sucked-in air by the dust collecting means for covering the heat exchanger including at least a half of the rear heat exchanger.

Also, the separate-type air conditioner may further comprise: air cleaning/dust collecting means disposed at a position corresponding to the upper edge portion of the front heat exchanger. In this case, dust is collected from sucked-in air by the air cleaning/dust collecting means disposed at a position corresponding to the upper, edge portion of the front heat exchanger.

Also, the separate-type air conditioner may further comprise: air cleaning/dust collecting means disposed either between a front panel and the dust collecting means or between the dust collecting means and the front heat exchanger. In this case, dust is collected from sucked-in air by the air cleaning/dust collecting means disposed either between a front panel and the dust collecting means or between the dust collecting means and the front heat exchanger.

Further, each of the separate-type air conditioners noted above may further comprise: a heat exchanger in which fins are bent at a bent connecting portion provided at a position close to an air inlet. In this case, the heat exchanger is bent at the bent connecting portion provided at a position on the fins which is close to the air inlet, so that each opening formed at the position close to the air inlet becomes narrow, thereby allowing the sucked-in air to easily come into contact with the fins.

Moreover, each of the separate-type air conditioners noted above may comprise: a heat exchanger in which fins are bent at a bent connecting portion provided at a position close to an air inlet, the heat exchanger having a junction which is formed as mutually opposing ends of the fins at the bent connecting portion approach each other. In this case, the heat exchanger is bent at the bent connecting portion provided at a position on the fins which is close to the air inlet, and mutually opposing ends of the fins at the bent connecting portion approach each other to form the junction. A gap between the opposing ends of the fins is reduced at the junction, thereby allowing the sucked-in air to easily come into contact with the fins.

BRIEF DESCRIPTION OF THE DRAWINGS

In the accompanying drawings:

FIG. 7 is a cross-sectional view of a separate-type air conditioner illustrating a seventh embodiment of the present invention;

FIG. 8 is a vertical sectional side elevation of a separation-type air conditioner illustrating an eighth embodiment of the present invention;

DETAILED DESCRIPTION OF THE PREFERRED EMBODIMENTS

1st Embodiment

Figure 1:
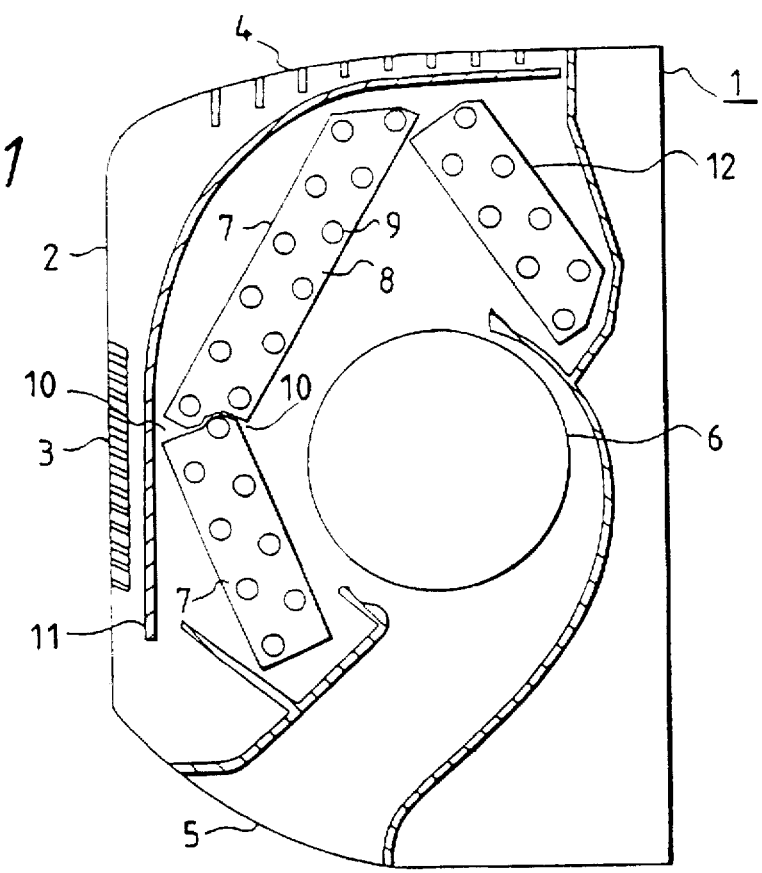
FIG. 1 is a cross-sectional view of a separate-type air conditioner illustrating a first embodiment of the present invention.

FIG. 1 is a cross-sectional view of a separation-type air conditioner illustrating an embodiment of the present invention. In the drawing, reference numeral (1) denotes a casing of an indoor unit of a separate-type air conditioner; (2), a front panel at the front surface of the casing (1); (3), a front air inlet provided in the front surface of the front panel (2); (4), an upper air inlet provided in the upper surface of the front panel (2); (5), an air outlet provided at the underside of the front panel (2); and (6), a cross flow fan provided in the casing (1) and disposed at a position corresponding to the air outlet (5).

Numeral (7) denotes a front heat exchanger disposed in the casing (1) and having an upper edge portion and a lower edge portion which are respectively formed in a receding manner and are disposed at positions corresponding to the front air inlet (3) and the upper air inlet (4), respectively. Numeral (8) denotes fins which are formed of a multiplicity of aluminum plates which are juxtaposed horizontally in a mutually spaced-apart relationship, their plate surfaces being arranged along the blowing direction of the cross flow fan (6). Numeral (9) denotes hair pin tubes of the front heat exchanger (7), the hair pin tubes (9) being formed by a plurality of heat exchanging pipes penetrating the fins (8).

Numeral (10) denotes notched portions which are formed on the front and rear sides of each fin (8) at a longitudinally intermediate position thereof, and numeral (11) denotes a filter disposed in front of the front heat exchanger (7).

Numeral (12) denotes a rear heat exchanger arranged in the same way as the front heat exchanger (7) and formed separately from the front heat exchanger (7), the rear heat exchanger (12) being disposed on the rear side of the front heat exchanger (7) in correspondence with the upper air inlet (4).

In the indoor unit of the separation-type air conditioner arranged as described above, an upper edge of the rear heat exchanger (12) is disposed in proximity to the upper edge of the front heat exchanger (7) within the casing (1), while the lower edge side of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, the cross flow fan (6) is disposed at a position surrounded by the front heat exchanger (7) and the rear heat exchanger (12). Furthermore, the front air inlet (3) is disposed in the front panel (2) at a position corresponding to the lower edge portion of the front heat exchanger (7), while the upper air inlet (4) is disposed in the front panel (2) at a position corresponding to the upper edge portions of the front heat exchanger (7) and the rear heat exchanger (12). Consequently, the circulation of a draft can be improved.

Furthermore, in the embodiment shown in FIG. 1, by making the area of the opening in the upper air inlet (4) larger than the area of the opening in the front air inlet (3), the intake of air and the discharge of air are balanced, making it possible to improve the heat exchanging efficiency.

2nd Embodiment

Figure 2:
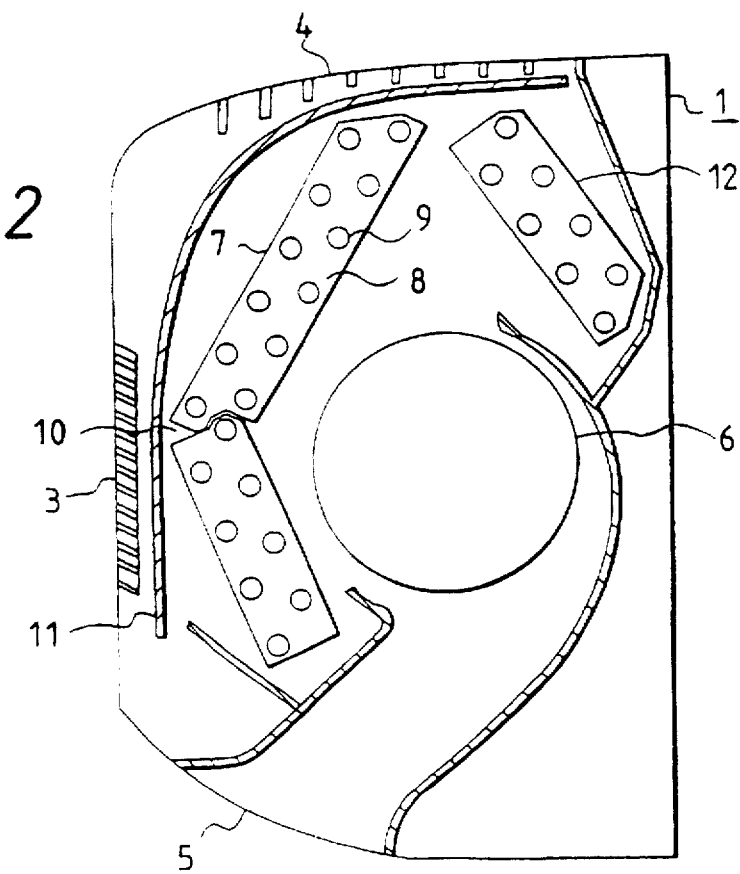
FIG. 2 is a cross-sectional view of a separate-type air conditioner illustrating a second embodiment of the present invention.

FIG. 2 is a cross-sectional view of a separation-type air conditioner illustrating another embodiment of the present invention. In the drawing, the same reference numerals as those of FIG. 1 show corresponding parts or portions, wherein numeral (12) denotes a rear heat exchanger arranged in the same way as the front heat exchanger (7) and formed separately from the front heat exchanger (7), the rear heat exchanger (12) being disposed on the rear side of the front heat exchanger (7) in correspondence with the upper air inlet (4). The rear heat exchanger (12) is disposed such that the upper edge of the rear heat exchanger (12) opposes the upper edge of the front heat exchanger (7) with a gap therebetween, while the lower edge side of the rear heat exchanger (12) is disposed at a position remote from the front heat exchanger (7).

In a cross section of the indoor unit of the separation-type air conditioner arranged as described above, the rear heat exchanger (12) is disposed in correspondence with the upper air inlet (4) on the rear side of the front heat exchanger (7) within the casing (1), and is arranged in the shape of a chevron with an apex portion removed in cooperation with the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 2, since the rear heat exchanger (12) is arranged in the shape of a chevron with an apex portion removed in cooperation with the front heat exchanger (7), it is possible to reduce non-uniformity in the velocity of a wind occurring in vicinities of upper portions of the front heat exchanger (7) and the rear heat exchanger (12). Hence, it is possible to reduce air current noise occurring on the blade surfaces of the cross flow fan (6) due to the nonuniformity of the velocity of the wind in the vicinities of the upper portions of the front heat exchanger (7) and the rear heat exchanger (12).

3rd Embodiment

Figure 3:
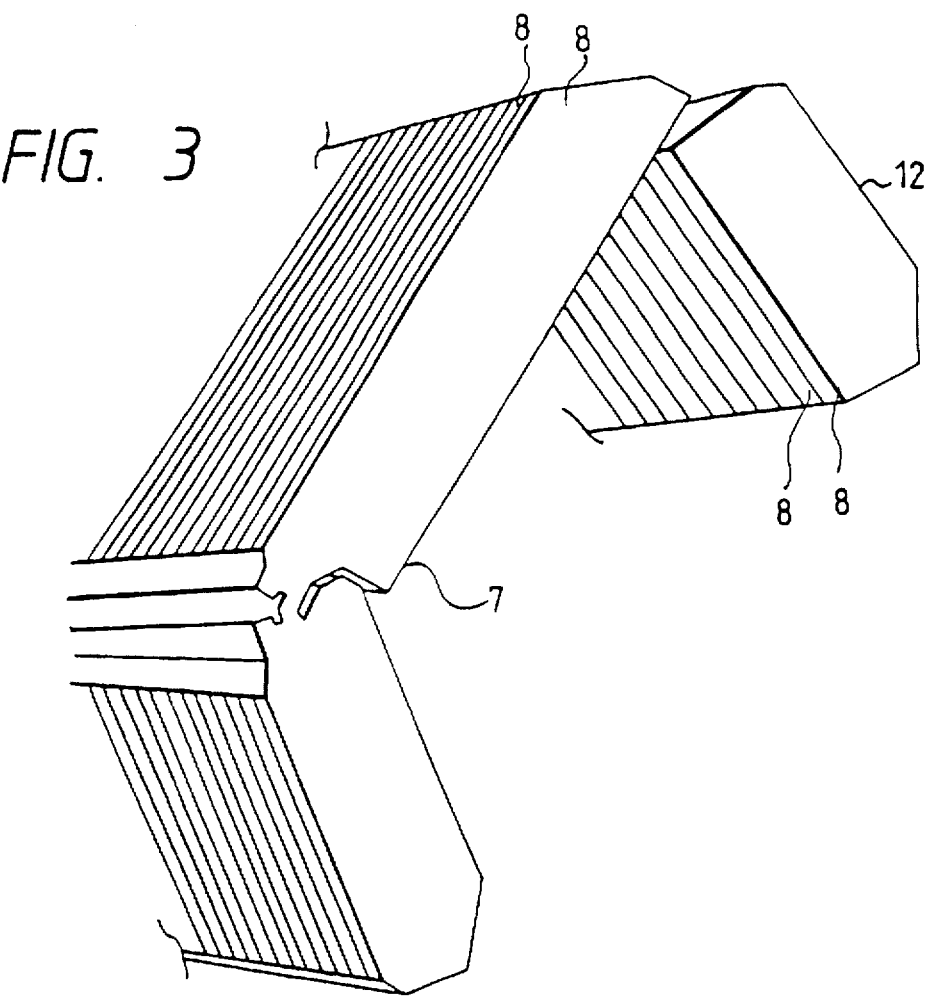
FIG. 3 is an enlarged perspective view corresponding to a heat exchanger portion shown in FIG. 1 and illustrates a third embodiment of the present invention.

FIG. 3 is a diagram illustrating still another embodiment of the present invention, and is an enlarged perspective view corresponding to the heat exchanger portion shown in FIG. 1, the other portions of FIG. 3 being arranged in the same way as those of FIG. 1. In the drawing, the same reference numerals as those of FIG. 1 show corresponding parts or portions, wherein numeral (12) denotes a rear heat exchanger arranged in the same way as the front heat exchanger (7) and formed separately from the front heat exchanger (7), the rear heat exchanger (12) being disposed on the rear side of the front heat exchanger (7) in correspondence with the upper air inlet (4). The rear heat exchanger (12) is disposed such that the upper edge of the front rear heat exchanger (12) opposes the upper edge of the front heat exchanger (7) with a gap therebetween, while the lower edge side of the rear heat exchanger (12) is disposed at a position remote from the front heat exchanger (7). In addition, the fins (8) of the rear heat exchanger (12) are juxtaposed at intervals greater than those of the fins (8) of the front heat exchanger (7).

In the indoor unit of the separation-type air conditioner arranged as described above, the upper edge of the rear heat exchanger (12) is disposed in proximity to the upper edge of the front heat exchanger (7) inside the casing (1), and the lower edge side of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 3, since the fins (8) of the rear heat exchanger (12) are juxtaposed at intervals greater than those of the fins (8) of the front heat exchanger (7), after the wind velocity is uniformalized at the front surfaces of the front heat exchanger (7) and the rear heat exchanger (12), air passes through the cross flow fan (6) and is blown out from the air outlet (5). Accordingly, it is possible to reduce noise occurring due to the nonuniformity of the velocity of winds flowing through the front heat exchanger (7) and the rear heat exchanger (12).

4th Embodiment

Figure 4:
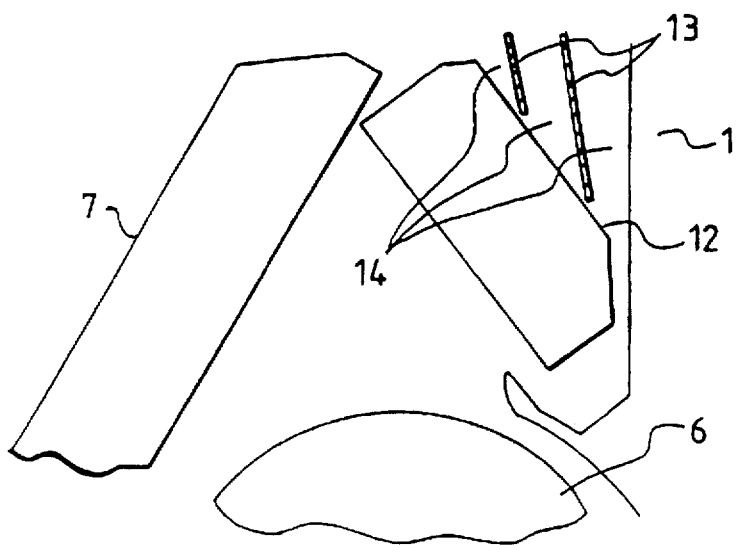
FIG. 4 is an enlarged view corresponding to an upper edge portion of the heat exchanger portion shown in FIG. 1 and illustrates a fourth embodiment of the present invention.

FIG. 4 is a diagram illustrating a further embodiment of the present invention, and is an enlarged view corresponding to the upper edge portion of the heat exchanger portion shown in FIG. 1, the other portions of FIG. 4 being arranged in the same way as those of FIG. 1. In the drawing, the same reference numerals as those of FIG. 1 show corresponding parts or portions, wherein numeral (13) denotes stationary casing blades provided in the casing (1) and disposed above the rear heat exchanger (12) by being spaced apart from each other, and numeral (14) denotes a plurality of split-nozzle blow paths formed by the stationary casing blades (13).

In the indoor unit of the separation-type air conditioner arranged as described above, the upper edge of the rear heat exchanger (12) is disposed in proximity to the upper edge of the front heat exchanger (7) inside the casing (1), and the lower edge side of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 4, air flows in through the upper air inlet (4) due to the operation of the cross flow fan (6), and flows into the rear heat exchanger (12) via the split-nozzle blow paths (14). Furthermore, the stationary casing blades (13) are formed in such a shape as to reduce the rate of air flowing through an upper portion of the rear heat exchanger (12) and increase the rate of air flowing through a lower portion thereof, so as to entirely uniformalize the rate of air flowing into the rear heat exchanger (12). Accordingly, the velocity of a wind flowing through the heat exchanger is made uniform, thereby making it possible to reduce the noise.

5th Embodiment

Figure 5:
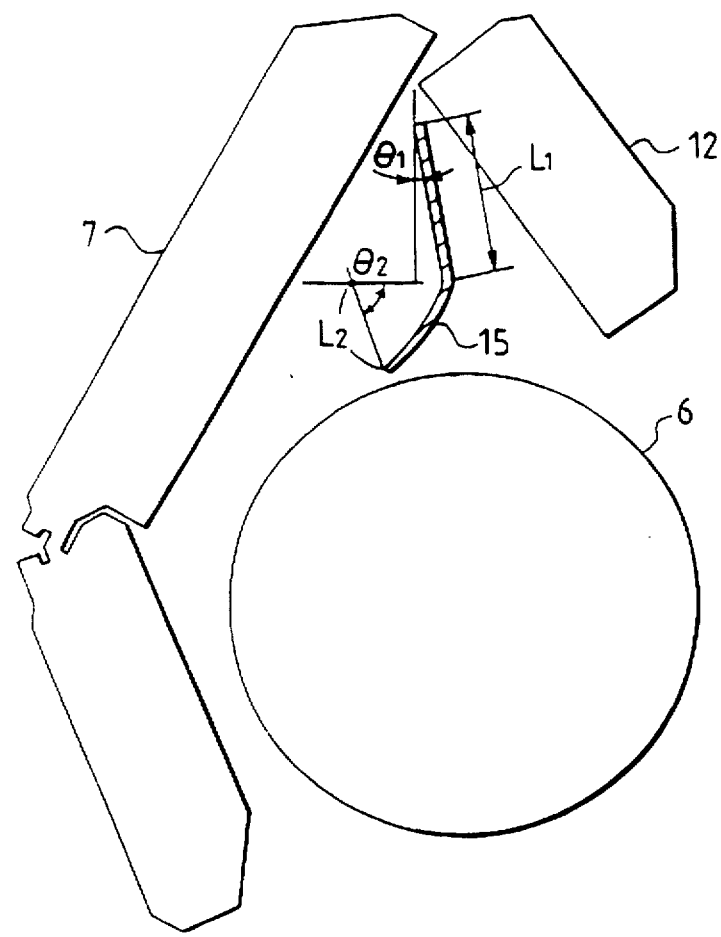
FIG. 5 is an enlarged view corresponding to the heat exchanger portion shown in FIG. 1 and illustrates a fifth embodiment of the present invention.

FIG. 5 is a diagram illustrating a still further embodiment of the present invention, and is an enlarged view corresponding to the heat exchanger portion shown in FIG. 1, the other portions of FIG. 5 being arranged in the same way as those of FIG. 1. In the drawing, the same reference numerals as those of FIG. 1 show corresponding parts or portions, wherein numeral (15) denotes a guide blade provided in the casing (1). The guide blade (15) is, arranged in such a manner as to be suspended downward with its upper edge disposed in proximity to opposing portions of the front heat exchanger (7) and the rear heat exchanger (12), a lower edge portion thereof being bent toward the front heat exchanger (7).

In the indoor unit of the separation-type air conditioner arranged as described above, the upper edge of the rear heat exchanger (12) is disposed in proximity to the upper edge of the front heat exchanger (7) inside the casing (1), and the lower edge of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 5, air flows into the cross flow fan (6) through the front heat exchanger (7) and the rear heat exchanger (12) along the guide blade (15) due to the operation of the cross flow fan (6). In addition, the guide blade (15) is formed in a configuration conforming to the flow line of air from the opposing portions of the front heat exchanger (7) and the rear heat exchanger (12) to the cross flow fan (6).

It should be noted that the configuration of the guide blade (15) is such that $\theta_1 = -1°$ to $9°$, $\theta_2 = 24°$ to $34°$, $L_1 = 33$ mm to 43 mm, and $L_2 = 63$ mm to 73 mm.

The guide blade (15) makes it possible to eliminate a disturbance caused by the confluence of air flowing into the cross flow fan (6), thereby making it possible to eliminate a portion where the wind velocity changes extremely. Accordingly, the velocity of a wind flowing through the heat exchangers is made uniform, thereby making it possible to reduce the noise.

6th Embodiment

Figure 6:
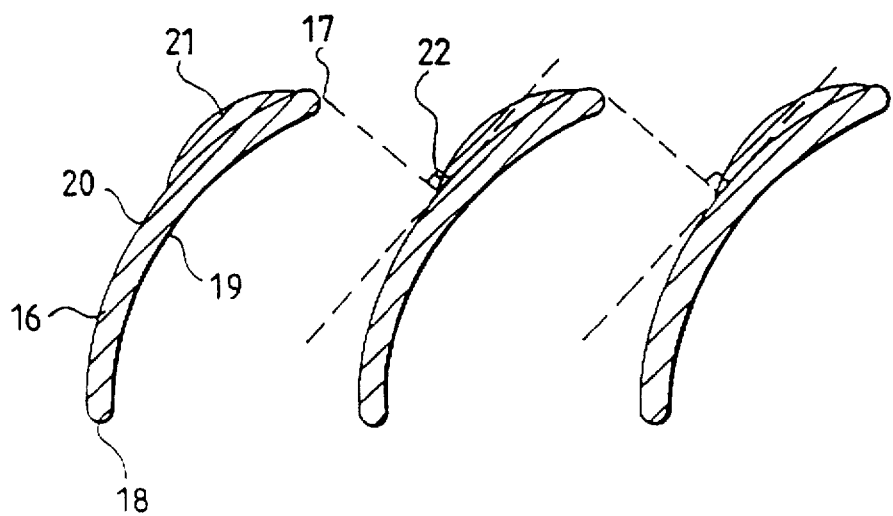
FIG. 6 is an enlarged view corresponding to a cross flow fan portion shown in FIG. 1 and illustrates a sixth embodiment of the present invention.

FIG. 6 is a diagram illustrating a further embodiment of the present invention, and is an enlarged view corresponding to the cross flow fan shown in FIG. 1, the other portions of FIG. 6 being arranged in the same way as those of FIG. 1. In the drawing, the same reference numerals as those of FIG. 1 show corresponding parts or portions, wherein numeral (16) denotes a blade of the cross flow fan (6) in which are formed an outer peripheral blade end (17), an inner peripheral blade end (18), a blade pressure surface (19), a blade negative-pressure surface (20), an arcuate curled portion (21), and an arcuate curled portion end (22).

In the indoor unit of the separation-type air conditioner arranged as described above, the upper edge of the rear heat exchanger (12) is disposed in proximity to the upper edge of the front heat exchanger (7) inside the casing (1), and the lower edge of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 6, the blade (16) of the cross flow fan (6) is formed in a configuration in which the arcuate curled portion (21) is added to the blade negative-pressure surface (20) at the fan outer-peripheral blade end (17) of the blade (16). For this reason, even if the air current which passes the blade (16) of the cross flow fan (6) for the first time flows in from a direction which forms a large angle with respect to the blade (16), it is possible to suppress the occurrence of a release at the time of flowing round to the blade negative-pressure surface (20) side at the forward edge of the blade (16). Accordingly, it is possible to improve both the blowing performance and the noise characteristic.

7th Embodiment

FIG. 7 is a cross-sectional view of a separation-type air conditioner illustrating a further embodiment of the present invention. In the drawing, the same reference numerals as those of FIG. 1 show corresponding parts or portions, wherein numeral (4) denotes the upper air inlet provided in the upper surface of the front panel (2), and the upper air inlet (4) is comprised of a plurality of openings in which intervals between adjacent openings at a portion of the upper air inlet (4) which is close to the front panel (2) and at a portion thereof which is remote from the front panel (2) are arranged to be greater than intervals between adjacent openings at an intermediate portion of the upper air inlet (4).

In the indoor unit of the separation-type air conditioner arranged as described above, the upper edge of the rear heat exchanger (12) is disposed in proximity to the upper edge of the front heat exchanger (7) inside the casing (1), and the lower edge of the rear heat exchanger (12) is disposed at a position remote from the front heat exchanger (7).

As a result, in an indoor unit having the casing (1) of the same height, it is possible to increase the heat exchanging area, and the heat exchanging capacity improves. Accordingly, in the compact indoor unit in which the height of the casing (1) is low, it is possible to obtain high-performance heat exchanging capabilities.

In addition, in the embodiment shown in FIG. 7, the intervals between adjacent openings at the portion of the upper air inlet (4) which is close to the front panel (2) and at the portion thereof which is remote from the front panel (2) are arranged to be greater than intervals between adjacent openings at the intermediate portion of the upper air inlet (4). For this reason, after the flow rate of air, which has flown in through the front air inlet (3) and the upper air inlet (4) due to the operation of the cross flow fan (6), is uniformalized at the front surfaces of the front heat exchanger (7) and the rear heat exchanger (12), the air passes through the cross flow fan (6) and is blown out through the air outlet (5). Accordingly, it is possible to reduce noise occurring due to the nonuniformity of the velocity of winds flowing through the front heat exchanger (7) and the rear heat exchanger (12).

Moreover, the heat exchangers are constituted by the front heat exchanger (7) whose upper and lower edge portions are respectively made to recede and the rear heat exchanger (12) disposed on the rear side of the front heat exchanger (7). Then, since the dust collecting means (11) for covering these heat exchangers is provided, it is possible to obtain an efficient dust-collecting effect.

In addition, as at least a half of the rear heat exchanger (12) and the front heat exchanger (7) are covered with the dust collecting means (11), it is possible to obtain a required dust-collecting effect.

8th Embodiment

Figure 9:
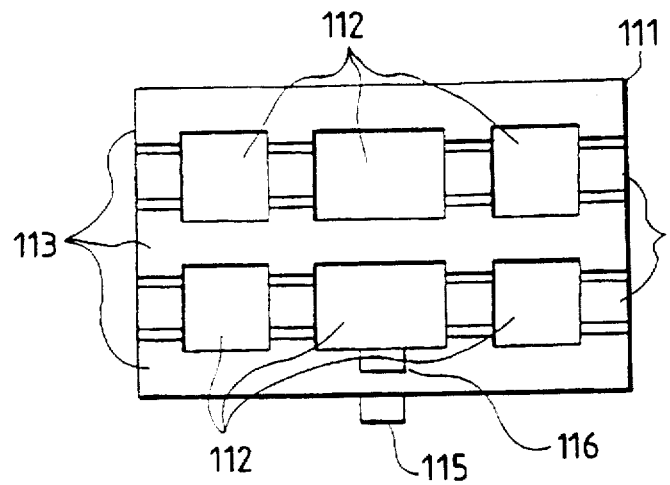
FIG. 9 is a developed front elevation of a dust collecting means shown in FIG. 8.
Figure 10:
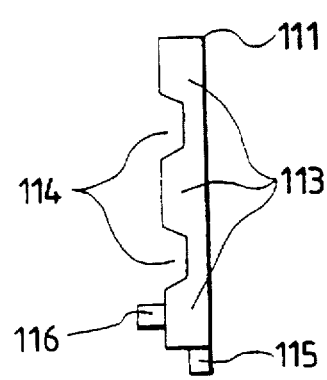
FIG. 10 is a right side elevation of FIG. 9.

FIGS. 8 to 10 are diagrams illustrating a further embodiment of the present invention, in which FIG. 8 is a vertical sectional side elevation of a separation-type air conditioner; FIG. 9 is a developed front elevation of a dust collecting means shown in FIG. 8; and FIG. 10 is a right side elevation of FIG. 9. In the drawings, reference numeral (1) denotes the casing of the indoor unit of a separate-type air conditioner; (2), the front panel at the front surface of the casing (1); (3), the front air inlet provided in the front surface of the front panel (2); (4), the upper air inlet provided in the upper surface of the front panel (2); (5), the air outlet provided at the underside of the front panel (2); and (6), the cross flow fan provided in the casing (1) and disposed at a position corresponding to the air outlet (5).

Numeral (7) denotes the front heat exchanger disposed in the casing (1) and having an upper edge portion and a lower edge portion which are respectively formed in a receding manner and are disposed at positions corresponding to the front air inlet (3) and the upper air inlet (4), respectively. Numeral (8) denotes fins which are formed of a multiplicity of aluminum plates which are juxtaposed horizontally in a mutually spaced-apart relationship, their plate surfaces being arranged along the blowing direction of the cross flow fan (6). Numeral (9) denotes hair pin tubes of the front heat exchanger (7), the hair pin tubes (9) being formed by a plurality of heat exchanging pipes penetrating the fins (8).

Numeral (100) denotes a bent portion formed between the upper edge portion and the lower edge portion of the front heat exchanger (7), and numeral (111) denotes a plate-like dust collecting means disposed in such a manner as to cover the front air inlet (3) and the upper air inlet (4), the dust collecting means (111) being comprised of net-like dust-collecting portions (112) having a dust-collecting function, a frame (113) for fixing the dust-collecting portions (112), thin-walled portions (114) for bending which are provided on the frame (113) in the form of strips, have their longitudinal directions arranged horizontally, and are disposed in parallel in spaced-apart relation to each other, a horizontal-movement preventing piece (115) projecting downward, and a vertical-movement preventing piece (116) projecting toward the front.

Numeral (12) denotes the rear heat exchanger arranged in the same way as the front heat exchanger (7) and formed separately from the front heat exchanger (7). The rear heat exchanger (12) is disposed on the rear side of the front heat exchanger (7) in correspondence with the upper air inlet (4), and is arranged such that its upper edge portion is disposed in proximity to the front heat exchanger (7) and its lower edge portion is inclined in a direction away from the front heat exchanger (7). Numeral (221) denotes a stopper provided on the inner surface of the front panel (2). The stopper (221) supports the vertical-movement preventing piece (116) by means of its upper surface, and is provided with a fitting hole (222) into which the horizontal-movement preventing piece (115) is fitted.

Numeral (23) denotes an air-cleaning/dust-collecting means which is disposed at a position close to an upper portion of the front panel (2), and is arranged between the dust collecting means (111) and the inner surface of the front panel (2).

In the indoor unit of the separation-type air conditioner arranged as described above, the dust collecting means (111) is mounted in the casing (1) through the following operation: Namely, the front panel (2) is opened, and the dust collecting means (111) is placed in such a manner as to cover the front heat exchanger (7) and the rear heat exchanger (12). Then, if the horizontal-movement preventing piece (115) of the dust collecting means (111) is fitted in the fitting hole (222) of the stopper (221), the vertical-movement preventing piece (116) is supported on the stopper (221). The dust collecting means (111) is thereby disposed in a predetermined position inside the casing (1).

In addition, when the dust collecting means (111) is mounted, the dust collecting means (111) can be easily shaped into a configuration adapted to the shapes of the front heat exchanger (7) and the rear heat exchanger (12) by means of the thin-walled portions (114) for bending.

Consequently, the dust collecting means (111) can be easily mounted in a predetermined position inside the casing through a simple operation.

The upper air inlet (4) portion provided at the upper surface of the front panel (2) is arranged to be openable, and the air-cleaning/dust-collecting means (23) can be mounted or demounted by opening this portion. In addition, since the dust collecting means (111) is provided with the plurality of thin-walled portions (114), the dust collecting means (111) can be used as common component parts for indoor units of a multiplicity of types.

Also, since the air-cleaning/dust-collecting means (23) is disposed in correspondence with the upper edge portion of the front heat exchanger (7), it is possible to obtain an efficient dust-collecting effect. Furthermore, by disposing the air-cleaning/dust-collecting means (23) either between the front panel (2) and the dust collecting means (111) or between the dust collecting means (111) and the front heat exchanger (7), it is possible to obtain a required dust-collecting effect.

9th Embodiment

Figure 11:
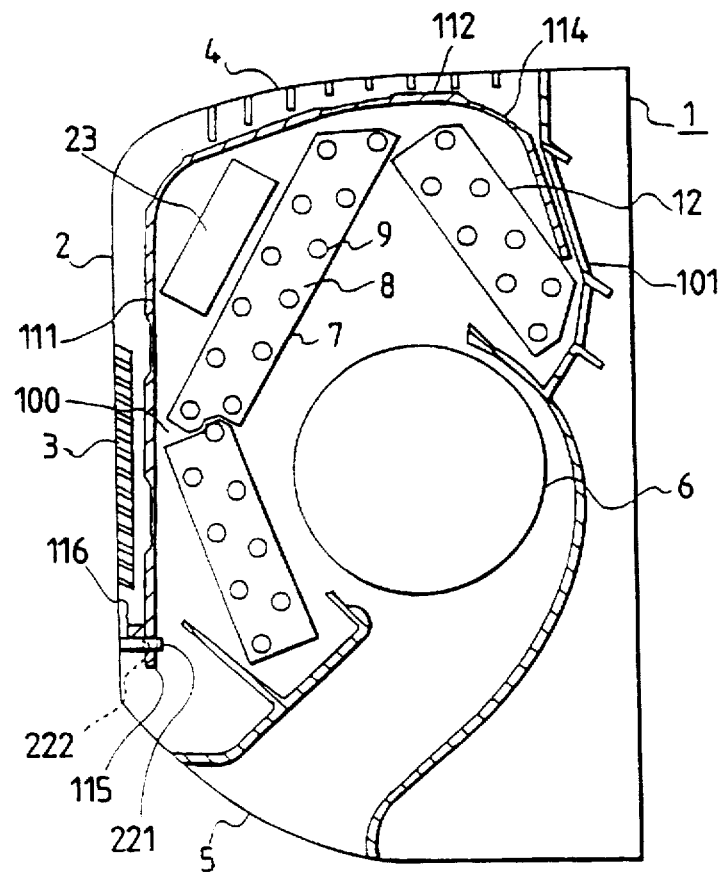
FIG. 11 is a vertical sectional side elevation of a separation-type air conditioner illustrating a ninth embodiment of the present invention.

FIG. 11 is also a vertical sectional side elevation of a separation-type air conditioner illustrating a further embodiment of the present invention. In the drawing, the same reference numerals as those in FIGS. 8 to 10 show corresponding parts or portions. Reference numeral (101) denotes a rear air inlet provided in an upper rear surface of the casing (1); (111) denotes the dust collecting means disposed in such a manner as to cover the upper air inlet (4) and the rear air inlet (101) and mounted along the inner surface of the front panel (2); and (23) denotes the air-cleaning/dust-collecting means disposed between the dust collecting means (111) and the front heat exchanger (7).

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIG. 11.

In addition, in the embodiment shown in FIG. 11, since the dust collecting means (111) is mounted along the inner surface of the casing (1), the area of the dust collecting means (111) is enlarged, so that the dust-collecting capabilities can be improved. Furthermore, since the dust-collecting portions (112) are provided for the upper air inlet (4) and the rear air inlet (101), respectively, it is possible to obtain a more reliable dust-collecting effect. For this reason, in the indoor unit of the casing (1) having the same height, it is possible to obtain high dust-collecting capabilities.

10th Embodiment

Figure 12:
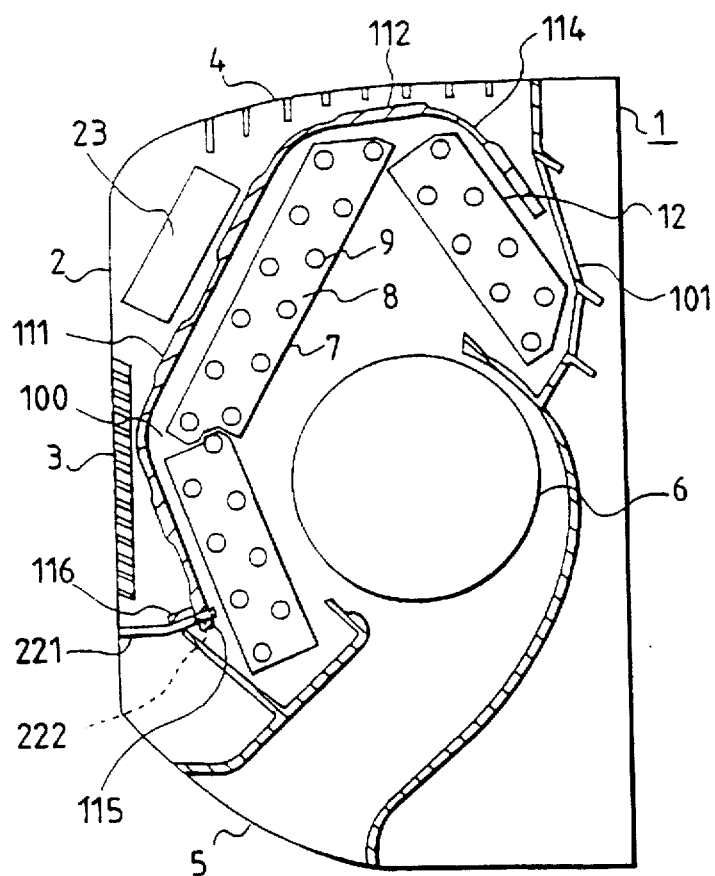
FIG. 12 is a vertical sectional side elevation of a separation-type air conditioner illustrating a 10th embodiment of the present invention.

FIG. 12 is also a vertical sectional side elevation of a separation-type air conditioner illustrating a further embodiment of the present invention. In the drawing, the same reference numerals as those in FIGS. 8 to 10 show corresponding parts or portions. Reference numeral (111) denotes the dust collecting means covering both the front heat exchanger (7) and the rear heat exchanger (12) and mounted in such a manner as to conform to the respective configurations of these heat exchangers; and (23) denotes the air-cleaning/dust-collecting means disposed between the dust collecting means (111) and the front panel (2).

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIG. 12.

In addition, in the embodiment shown in FIG. 12, since the dust collecting means (111) is made to conform to the configurations of the front heat exchanger (7) and the rear heat exchanger (12) and is mounted on the inner surface of the front panel, the area of the dust collecting means (111) is enlarged, so that the dust-collecting capabilities can be improved. For this reason, in the indoor unit of the casing (1) having the same height, it is possible to obtain high dust-collecting capabilities. Additionally, since the dust collecting means (111) is disposed in conformity to the configurations of the front heat exchanger (7) and the rear heat exchanger (12), the space within the casing (1) can be saved, and unillustrated devices for other functions can be accommodated in the saved space.

11th Embodiment

Figure 13:
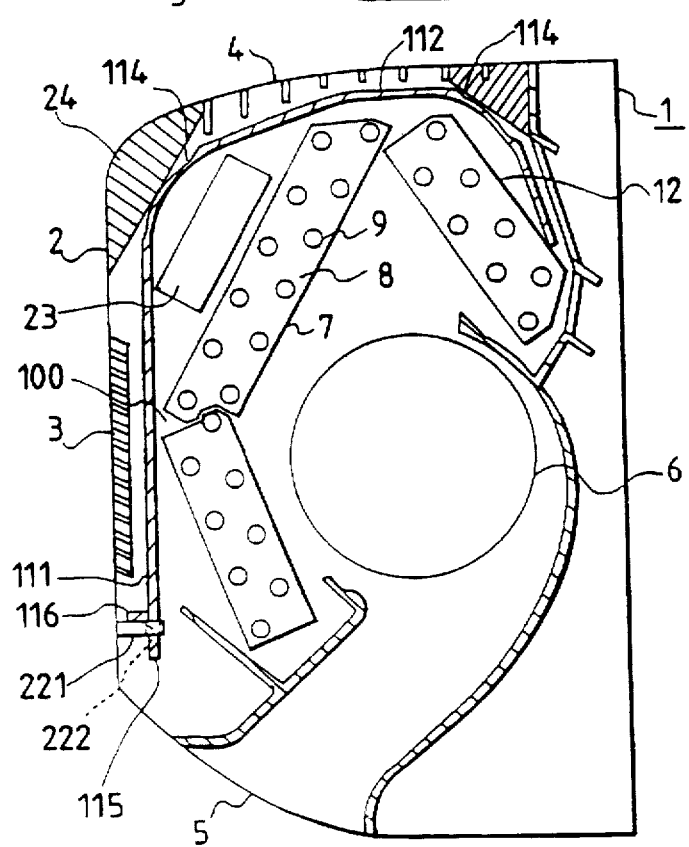
FIG. 13 is a vertical sectional side elevation of a separation-type air conditioner illustrating a 11th embodiment of the present invention.

FIG. 13 is also a vertical sectional side elevation of a separation-type air conditioner illustrating a further embodiment of the present invention. In the drawing, the same reference numerals as those in FIGS. 8 to 10 show corresponding parts or portions. Reference numeral (24) denotes guide pieces which are disposed at a corner portion between the front air inlet (3) and the upper air inlet (4) in the panel (2) and at a corner portion between the upper air inlet (4) and the rear air inlet (101). Numeral (23) denotes the air-cleaning/dust-collecting means disposed between the dust collecting means (111) and the front heat exchanger (7).

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIG. 13.

In addition, in the embodiment shown in FIG. 13, when the dust collecting means (111) is mounted, the dust collecting means (111) is guided to a predetermined position by the guide pieces (24), so that the dust collecting means (111) can be easily mounted in a predetermined position in the casing (1) by a simpler operation.

12th Embodiment

Figure 14:
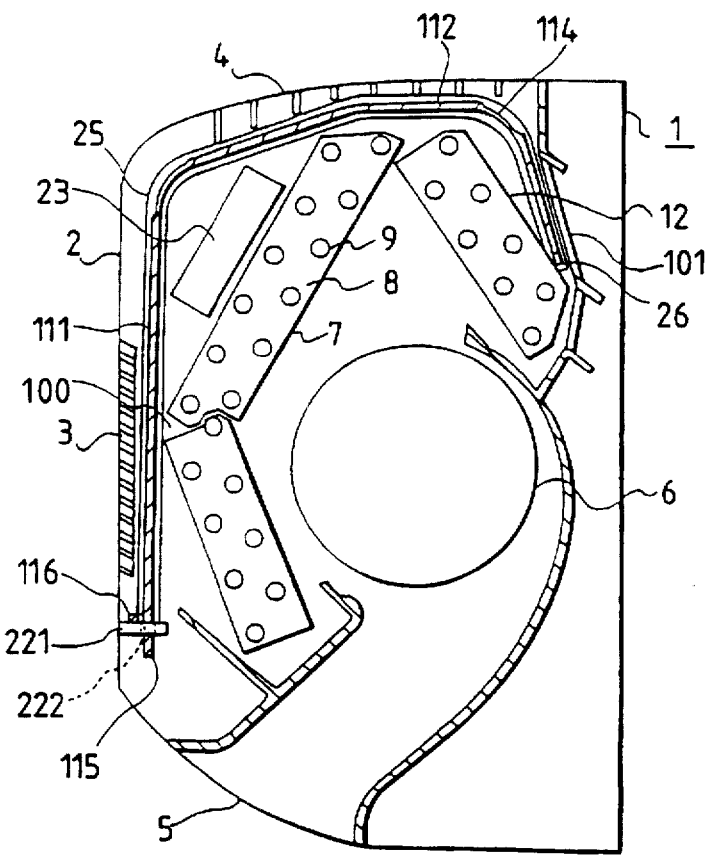
FIG. 14 is a vertical sectional side elevation of a separation-type air conditioner illustrating a 12th embodiment of the present invention.

FIG. 14 is also a vertical sectional side elevation of a separation-type air conditioner illustrating a further embodiment of the present invention. In the drawing, the same reference numerals as those in FIGS. 8 to 10 show corresponding parts or portions. Reference numeral (25) denotes a guide rail in the form of a groove which is provided in the casing (1) and is disposed along the front air inlet (3) and the upper air inlet (4) in the panel (2) and in correspondence with the front heat exchanger (7) and the rear heat exchanger (12). Numeral (26) denotes a stopper provided at a terminating end of the guide rail (25) at a position close to the rear heat exchanger (12). Numeral (23) denotes the air-cleaning/dust-collecting means disposed between the dust collecting means (111) and the front heat exchanger (7).

In the indoor unit of the separation-type air conditioner arranged as described above, the dust collecting means (111) having the thin-walled portions (114) for bending is inserted into the guide rail (25) and is guided by making use of the guiding action through an operation similar to that of the embodiment shown in FIGS. 8 to 10. Then, the dust collecting means (111) is stopped at a predetermined position by the stopper (26) and is thus mounted. Accordingly, although a detailed description will be omitted, it is apparent that an effect similar to that of the embodiment shown in FIGS. 8 to 10 for mounting the dust collecting means (111) in a predetermined position within the casing (1) can also be obtained easily in the embodiment shown in FIG. 14 through an even simpler operation.

In addition, in the embodiment shown in FIG. 14, the upper air inlet (4) portion is arranged to be openable, and after the upper air inlet (4) portion is opened, the dust collecting means (111) is mounted at a predetermined position by means of the guide rail (25) and the stopper (26). Furthermore, since the dust-collecting portions (112) are disposed at the front air inlet (3) the upper air inlet (4), and the rear air inlet (101), respectively, it is possible to obtain a more reliable dust-collecting effect.

13th Embodiment

Figure 15:
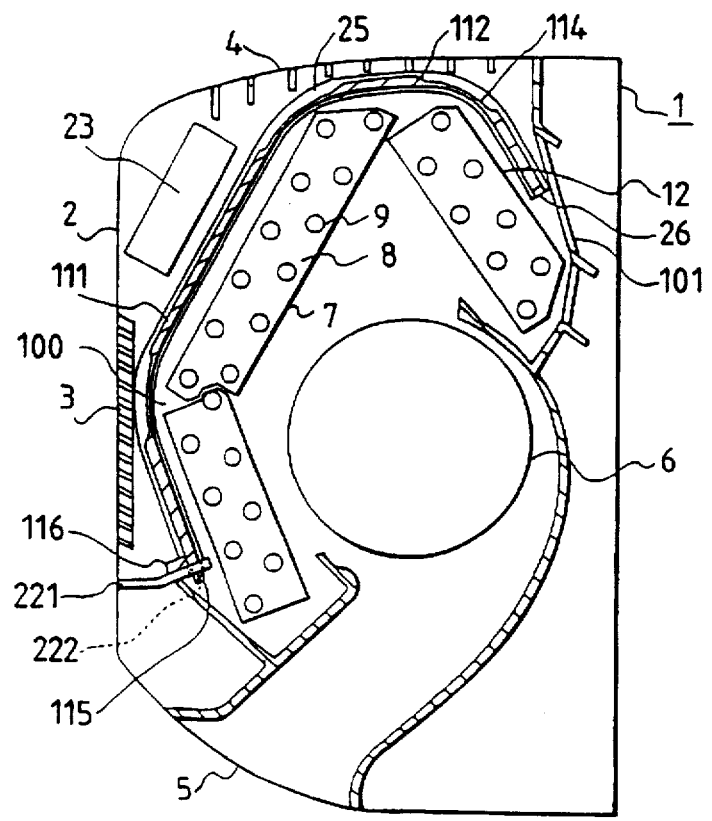
FIG. 15 is a vertical sectional side elevation of a separation-type air conditioner illustrating a 13th embodiment of the present invention.

FIG. 15 is also a vertical sectional side elevation of a separation-type air conditioner illustrating a further embodiment of the present invention. In the drawing, the same reference numerals as those in FIGS. 8 to 10 show corresponding parts or portions. Reference numeral (25) denotes the guide rail in the form of a groove which is provided in the casing (1) and is disposed in correspondence with the front heat exchanger (7) and the rear heat exchanger (12) in the front panel (2). Numeral (26) denotes the stopper provided at the terminating end of the guide rail (25) at a position close to the rear heat exchanger (12).

In the indoor unit of the separation-type air conditioner arranged as described above, the dust collecting means (111) having the thin-walled portions (114) for bending is inserted into the guide rail (25) and is guided by making use of the guiding action through an operation similar to that of the embodiment shown in FIGS. 8 to 10. Then, the dust collecting means (111) is stopped at a predetermined position by the stopper (26) and is thus mounted. Accordingly, although a detailed description will be omitted, it is apparent that an effect similar to that of the embodiment shown in FIGS. 8 to 10 for mounting the dust collecting means (111) in a predetermined position within the casing (1) can also be obtained easily in the embodiment shown in FIG. 15 through an even simpler operation.

In addition, in the embodiment shown in FIG. 15, the upper air inlet (4) portion is arranged to be openable, and after the upper air inlet (4) portion is opened, the dust collecting means (111) is mounted at a predetermined position by means of the guide rail (25) and the stopper (26). Furthermore, since the dust collecting means (111) is disposed in conformity to the configurations of the front heat exchanger (7) and the rear heat exchanger (12), the space within the casing (1) can be saved, and unillustrated devices for other functions can be accommodated in the saved space.

14th Embodiment

Figure 16:
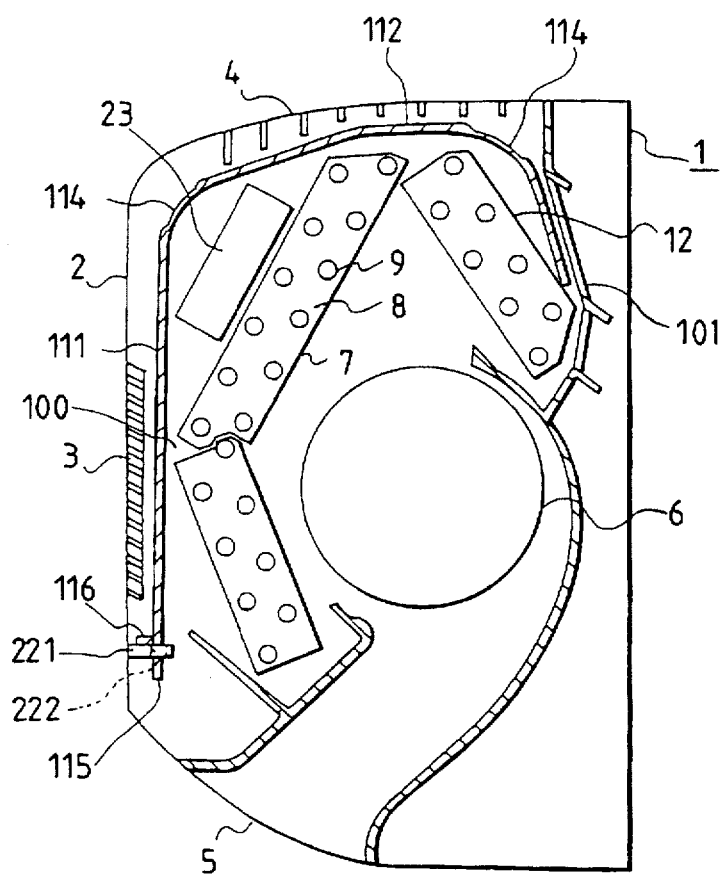
FIG. 16 is a vertical sectional side elevation of a separation-type air conditioner illustrating a 14th embodiment of the present invention.

FIG. 16 is also a vertical sectional side elevation of a separation-type air conditioner illustrating a further embodiment of the present invention. In the drawing, the same reference numerals as those in FIGS. 8 to 10 show corresponding parts or portions. Reference numeral (111) denotes the dust collecting means which is provided in the casing (1) and in which the thin-walled portions (114) for bending are provided in respective corner portions close to the upper front and the upper rear of the casing (1). Numeral (23) denotes the air-cleaning/dust-collecting means which is disposed between the dust collecting means (111) and the front heat exchanger (7).

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIG. 16 through a simpler operation.

In addition, in the embodiment shown in FIG. 16, since the dust collecting means (111) having the thin-walled portions (114) for bending formed in the respective corner portions close to the upper front and the upper rear of the casing (1) is mounted along the inner surface of the front panel (2) and the rear air inlet (101), the area of the dust collecting means (111) is enlarged, so that the dust-collecting capabilities can be improved. For this reason, in the indoor unit of the casing (1) having the same height, it is possible to obtain high dust-collecting capabilities.

Furthermore, since the thin-walled portions (114) of the dust collecting means (111) are formed in the respective corner portions close to the upper front and the upper rear of the casing (1), it is possible to obtain high dust-collecting capabilities.

Additionally, in the embodiment shown in FIG. 16, the upper air inlet (4) portion is arranged to be openable, and after the upper air inlet (4) portion is opened, the dust collecting means (111) is mounted at a predetermined position via the front panel (2) and the air-cleaning/dust-collecting means (23).

Moreover, since the thin-walled portions (114) of the dust collecting means (111) are reduced, the processing cost can be reduced, thereby making it possible to cut back on the fabrication cost.

15th Embodiment

Figure 17:
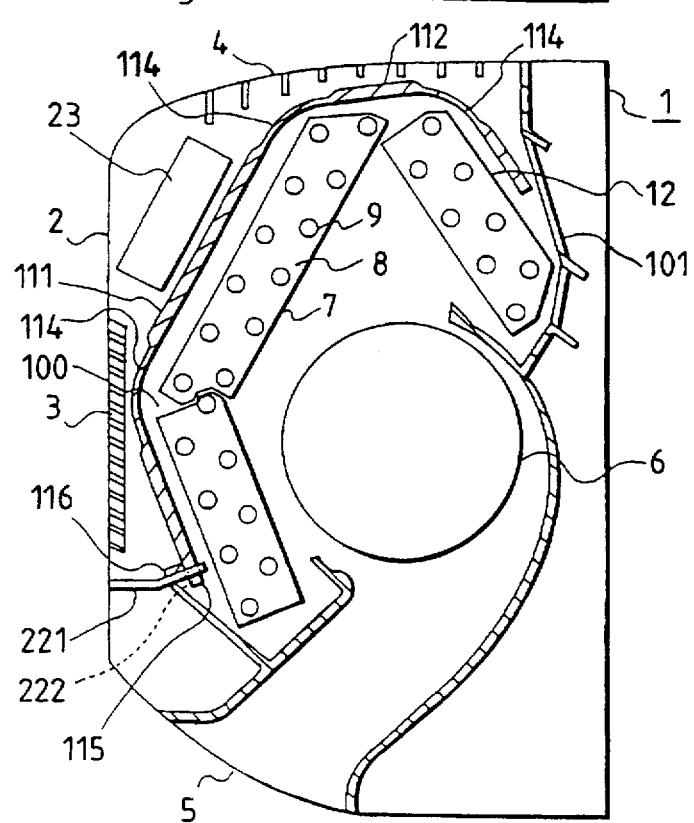
FIG. 17 is a vertical sectional side elevation of a separation-type air conditioner illustrating a 15th embodiment of the present invention.
Figure 18:
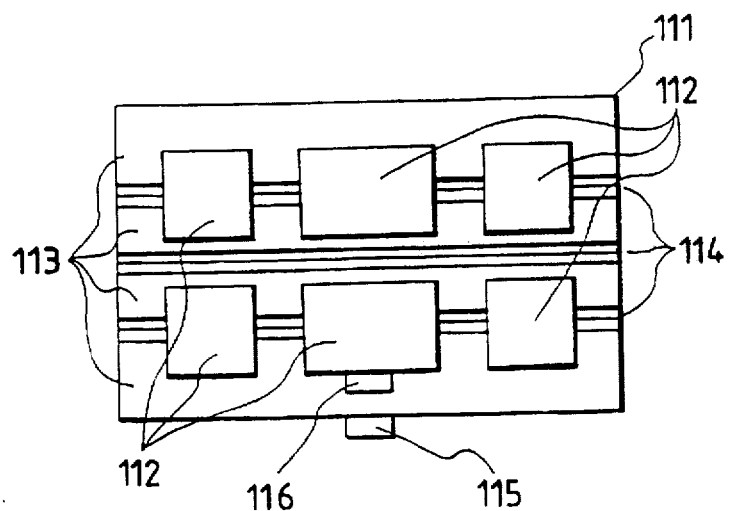
FIG. 18 is a developed front elevation of a dust collecting means shown in FIG. 17.
Figure 19:
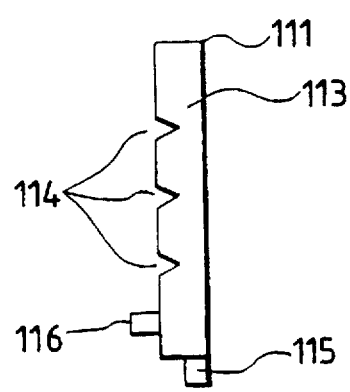
FIG. 19 is a right side elevation of FIG. 18.

FIGS. 17 to 19 are diagrams illustrating a further embodiment of the present invention, in which FIG. 17 is a vertical sectional side elevation of a separation-type air conditioner; FIG. 19 is a developed front elevation of a dust collecting means shown in FIG. 17; and FIG. 19 is a right side elevation of FIG. 18. In the drawings, the same reference numerals as those in FIGS. 8 to 10 show corresponding parts or portions. Reference numeral (111) denotes a plate-like dust collecting means which is disposed in such a manner as to cover the front heat exchanger (7) and the rear heat exchanger (12) and conform to the configurations of these heat exchangers. In the dust collecting means (111), the thin-walled portions (114) for bending are provided at positions corresponding to a bent portion of the front heat exchanger (7), an upper edge portion of the front heat exchanger (7), and an upper edge portion of the rear heat exchanger (12), respectively. The thin-walled portions (114) for bending have V-shaped cross sections, have their longitudinal directions arranged horizontally, and are disposed in parallel in spaced-apart relation to each other.

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIGS. 17 to 19.

In addition, in the embodiment shown in FIGS. 17 to 19, the dust collecting means (111) is made to conform to the configurations of both the front heat exchanger (7) and the rear heat exchanger (12) by means of the thin-walled portions (114) for bending, and is disposed along these heat exchangers. Accordingly, the area of the dust collecting means (111) is enlarged, so that the dust-collecting capabilities can be improved. For this reason, in the indoor unit of the casing (1) having the same height, it is possible to obtain high dust-collecting capabilities.

Additionally, in the embodiment shown in FIGS. 17 to 19, the upper air inlet (4) portion is arranged to be openable, and after the upper air inlet (4) portion is opened, the dust collecting means (111) is mounted at a predetermined position via the front panel (2) and the air-cleaning/dust-collecting means (23). Further, since the thin-walled portions (114) of the dust collecting means (111) are disposed at the bent corner portions in the configurations of the front heat exchanger (7) and the rear heat exchanger (12) as shown in FIG. 17, it is possible to obtain high dust-collecting capabilities.

Furthermore, since the dust collecting means (111) is disposed in conformity to the configurations of the front heat exchanger (7) and the rear heat exchanger (12), the space within the casing (1) can be saved, and unillustrated devices for other functions can be accommodated in the saved space. Moreover, since the thin-walled portions (114) of the dust collecting means (111) are reduced, the processing cost can be reduced, thereby making it possible to cut back on the fabrication cost.

16th Embodiment

Figure 20:
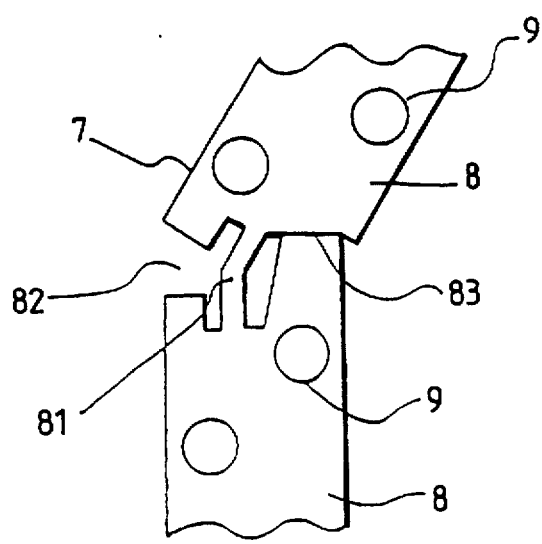
FIG. 20 is a diagram illustrating a 16th embodiment of the present invention and corresponds to FIG. 22 which is described later.
Figure 21:
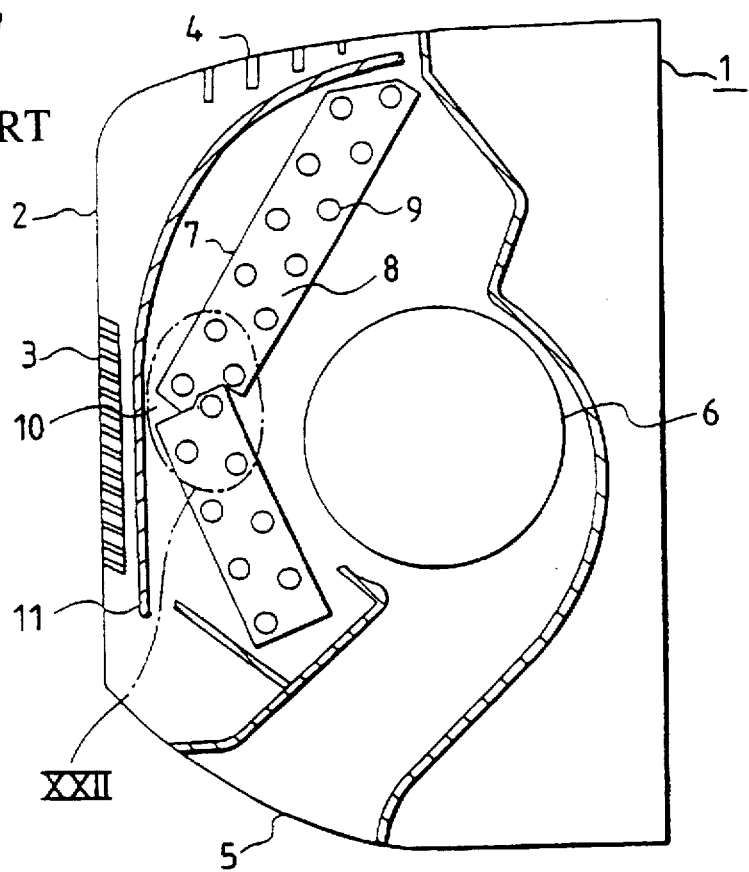
FIG. 21 is a cross-sectional view illustrating a conventional separate-type air conditioner.
Figure 22:
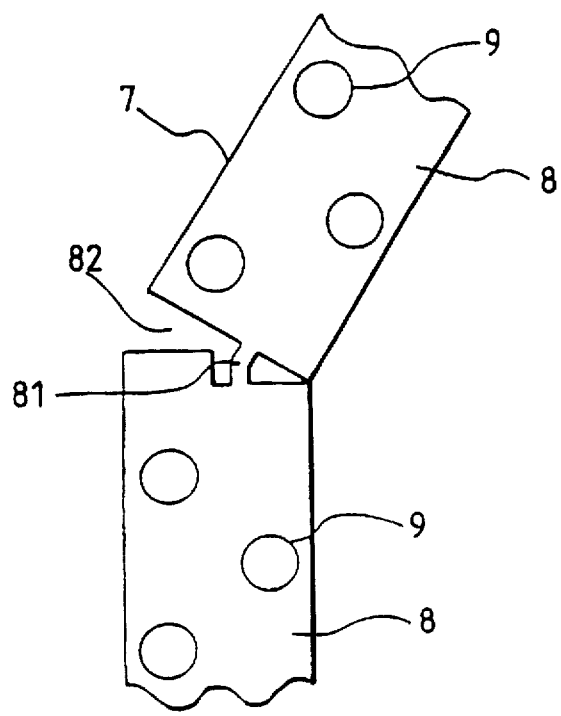
FIG. 22 is an enlarged view of a portion XXII of FIG. 21.

FIG. 20 is a diagram illustrating a further embodiment of the present invention and corresponding to FIG. 22 referred to earlier. As for other unillustrated components and portions of FIG. 20, the indoor unit of the separation-type air conditioner is arranged in the same way as in FIGS. 8 to 10 referred to above. In the drawings, the same reference numerals as those in FIGS. 8 to 10 show corresponding parts or portions. Reference numeral (81) denotes a bent connecting portion of the fins (8), which is provided at a position on the fins (8) which is close to the front air inlet (3). Numeral (82) denotes an opening which is formed on the front side of the bent portion as the fins (8) are bent at the bent connecting portion (81), and numeral (83) denotes a junction which is formed as vertically mutually opposing ends of the fins (8) approach each other when the fins (8) are bent at the bent connecting portion (81).

In the indoor unit of the separation-type air conditioner arranged as described above, the dust collecting means (111) having the thin-walled portions (114) for bending is mounted by an operation similar to that of the embodiment shown in FIGS. 8 to 10. Accordingly, although a detailed description will be omitted, it is apparent that an effect similar to that of the embodiment shown in FIGS. 8 to 10 can also be obtained in the embodiment shown in FIG. 20.

Also, in the embodiment shown in FIG. 20, as the bent connecting portion (81) is provided at a position on the fins (8) which is close to the front air inlet (3) and the fins (8) are bent, the vertically mutually opposing ends of the fins (8) approach each other and the junction (83) is formed. Consequently, each opening (82) becomes narrow, so that it is possible to overcome the drawback of dew condensation occurring on the cross flow fan (6) due to insufficient dehumidification because the air, which is sucked into the cross flow fan (6) through the openings (82), is difficult to come into contact with the fins (8). Accordingly, in the compact indoor unit in which the height of the casing (1) is low, it is possible to obtain high dehumidifying capabilities.

Additionally, as the junction (83) is formed when the fins (8) are bent and the vertically mutually opposing ends approach each other, a gap between the vertically mutually opposing ends decreases. Accordingly, it is also possible to overcome the drawback of dew condensation occurring on the cross flow fan (6) due to insufficient dehumidification because the air, which is sucked into the cross flow fan (6) through the openings (82), is difficult to come into contact with the fins (8). Accordingly, in the compact indoor unit in which the height of the casing (1) is low, it is possible to obtain high dehumidifying capabilities.

As described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger.

Consequently, it is possible to increase the heat exchanging area in the indoor unit having the same height, and improve the heat exchanging capacity. Therefore, there is an advantage in that high-performance heat exchanging capabilities can be obtained in a compact indoor unit whose height is low.

In addition, as described above, in accordance with the present invention, the front heat exchanger having an upper edge portion and a lower edge portion respectively formed in a receding manner is disposed in the indoor unit, and the rear heat exchanger formed separately from the front heat exchanger is disposed on the rear side of the front heat exchanger such that an upper edge of the rear heat exchanger is disposed in opposing relation to an upper edge of the front heat exchanger with a gap therebetween, and the rear heat exchanger is inclined downward.

Consequently, it is possible to increase the heat exchanging area in the indoor unit having the same height, and improve the heat exchanging capacity. Furthermore, it is possible to reduce nonuniformity in the velocity of a wind occurring in vicinities of upper portions of the front heat exchanger and the rear heat exchanger. Therefore, there is an advantage in that high-performance heat exchanging capabilities can be obtained in a compact indoor unit whose height is low. Additionally, there is an advantage in that it is possible to reduce air current noise occurring due to the nonuniformity of the velocity of the wind in the vicinities of the upper portions of the front heat exchanger and the rear heat exchanger.

In addition, as described above, in accordance with the present invention, the front heat exchanger having an upper edge portion and a lower edge portion respectively formed in a receding manner is disposed in the indoor unit, and the rear heat exchanger, which is formed separately from the front heat exchanger and whose fins are juxtaposed at intervals greater than those of fins of the front heat exchanger, is disposed on the rear side of the front heat exchanger.

Consequently, it is possible to increase the heat exchanging area in the indoor unit having the same height, and improve the heat exchanging capacity. Furthermore, after the wind velocity is uniformalized at the front surfaces of the front heat exchanger and the rear heat exchanger, air passes through the cross flow fan and is blown out from the air outlet. Therefore, there is an advantage in that high-performance heat exchanging capabilities can be obtained in a compact indoor unit whose height is low. Additionally, there is an advantage in that it is possible to reduce air current noise occurring due to the nonuniformity of the velocity of the wind in the vicinities of the upper portions of the front heat exchanger and the rear heat exchanger.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also, provided are stationary casing blades which form a plurality of split-nozzle blow paths for uniformalizing the rate of air flowing into the rear heat exchanger.

Consequently, it is possible to increase the heat exchanging area in the indoor unit having the same height, and improve the heat exchanging capacity. Furthermore, the stationary casing blades make it possible to reduce the rate of air flowing through an upper portion of the rear heat exchanger and increase the rate of air flowing through a lower portion thereof, thereby entirely uniformalizing the rate of air flowing into the rear heat exchanger. Therefore, there is an advantage in that high-performance heat exchanging capabilities can be obtained in a compact indoor unit whose height is low. Additionally, there is an advantage in that it is possible to uniformalize the velocity of a wind flowing through the heat exchanger, thereby making it possible to reduce the noise.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also provided is the guide blade with an upper edge disposed in proximity to opposing portions of the front heat exchanger and the rear heat exchanger, a lower edge portion of the guide blade being bent toward the front heat exchanger.

Consequently, it is possible to increase the heat exchanging area in the indoor unit having the same height, and improve the heat exchanging capacity. Furthermore, the guide blade makes it possible to eliminate a disturbance caused by the confluence of air flowing into the cross flow fan, thereby making it possible to eliminate a portion where the wind velocity changes extremely. Therefore, there is an advantage in that high-performance heat exchanging capabilities can be obtained in a compact indoor unit whose height is low. Additionally, there is an advantage in that it is possible to uniformalize the velocity of a wind flowing through the heat exchanger, thereby making it possible to reduce the noise.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also, the arcuate curled portion is provided on the blade negative-pressure surface of a blade of the cross flow fan of the indoor unit at a fan outer-peripheral blade end of the blade.

Consequently, it is possible to increase the heat exchanging area in the indoor unit having the same height, and improve the heat exchanging capacity. Furthermore, the occurrence of a release when the air current passing the blade for the first time flows round to the blade negative-pressure surface side at a forward edge of the blade, can be suppressed by the arcuate curved portion of the blade of the cross flow fan. Therefore, there is an advantage in that high-performance heat exchanging capabilities can be obtained in a compact indoor unit whose height is low, and there is another advantage in that it is possible to improve both the blowing performance and the noise characteristic.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also, the upper air inlet is disposed in an upper surface of the indoor unit such that intervals between adjacent ones of the openings at a portion of the upper air inlet which is close to the front and at a portion thereof which is close to the rear are arranged to be greater than intervals between adjacent ones of the openings at an intermediate portion of the upper air inlet.

Consequently, it is possible to increase the heat exchanging area in the indoor unit having the same height, and improve the heat exchanging capacity. Furthermore, since intervals between adjacent openings at positions close to respective edge portions of the upper air inlet are arranged to be greater than intervals between adjacent openings at the intermediate portion of the upper air inlet, after the flow rate of air, which has flown in, is uniformalized at the front surface of the heat exchanger, the air passes through the cross flow fan and is blown out through the air outlet. Therefore, there is an advantage in that high-performance heat exchanging capabilities can be obtained in a compact indoor unit whose height is low. Additionally, there is an advantage in that it is possible to reduce noise occurring due to the nonuniformity of the velocity of winds flowing through the front heat exchanger and the rear heat exchanger.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also provided are the fan disposed between the front heat exchanger and the rear heat exchanger and the front panel in which the front air inlet is provided at a position corresponding to the lower edge portion of the front heat exchanger and the upper air inlet is provided at a position corresponding to upper edge portions of the front heat exchanger and the rear heat exchanger.

Consequently, it is possible to increase the heat exchanging area in the indoor unit having the same height, and improve the heat exchanging capacity. Furthermore, air is sucked in by the fan disposed between the front heat exchanger and the rear heat exchanger, through the front air inlet provided in the front panel at a position corresponding to the lower edge portion of the front heat exchanger and through the upper air inlet provided therein at a position corresponding to upper edge portions of the front heat exchanger and the rear heat exchanger. Therefore, there is an advantage in that high-performance heat exchanging capabilities can be obtained in a compact indoor unit whose height is low. Additionally, there is an advantage in that the circulation of suction and discharge air is made excellent, thereby improving the heat exchanging efficiency.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger. Also provided are the fan disposed between the front heat exchanger and the rear heat exchanger and the front panel in which the front air inlet is provided at a position corresponding to the lower edge portion of the front heat exchanger and the upper air inlet is provided at a position corresponding to upper edge portions of the front heat exchanger and the rear heat exchanger. In addition, the area of openings of the upper air inlet is made greater than the area of openings in the front air inlet.

Consequently, it is possible to increase the heat exchanging area in the indoor unit having the same height, and improve the heat exchanging capacity. Furthermore, air is sucked in by the fan disposed between the front heat exchanger and the rear heat exchanger, through the front air inlet provided in the front panel at a position corresponding to the lower edge portion of the front heat exchanger and through the upper air inlet provided therein at a position corresponding to upper edge portions of the front heat exchanger and the rear heat exchanger. Additionally, air is sucked in through the upper air inlet having an area of openings greater than the area of openings in the front air inlet. Therefore, there is an advantage in that high-performance heat exchanging capabilities can be obtained in a compact indoor unit whose height is low. Moreover, there is an advantage in that the balance and circulation of suction and discharge air are made excellent, thereby improving the heat exchanging efficiency.

In addition, as described above, in accordance with the present invention, there are provided the heat exchanger disposed in the indoor unit and the plate-like dust collecting means disposed in such a manner as to cover the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other.

The plate-like dust collecting means, which is provided with the dust-collecting portions and the thin-walled portions for bending arranged in the form of strips, is mounted by being bent at the thin-walled portions in such a manner as to cover the heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

In addition, as described above, in accordance with the present invention, there are provided the heat exchanger disposed in the indoor unit and the plate-like dust collecting means disposed in such a manner as to cover the heat exchanger and arranged along the front air inlet, the upper air inlet, and the rear air inlet of the casing in which the heat exchanger is disposed, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other.

The plate-like dust collecting means, which is provided with the dust-collecting portions and the thin-walled portions for bending arranged in the form of strips, is mounted by being bent at the thin-walled portions in such a manner as to cover the heat exchanger, and is arranged along the front air inlet, the upper air inlet, and the rear air inlet of the casing. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the dust collecting means is mounted along the inner surface of the casing, the area can be enlarged, so that there is an advantage in that the dust-collecting capabilities can be improved, thereby making it possible to obtain high dust-collecting capabilities in the casing having the same height.

In addition, as described above, in accordance with the present invention, there are provided the heat exchanger disposed in the indoor unit and the plate-like dust collecting means disposed in such a manner as to cover the heat exchanger and conform to the configuration of the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other.

The plate-like dust collecting means, which is provided with the dust-collecting portions and the thin-walled portions for bending arranged in the form of strips, is mounted by being bent at the thin-walled portions in such a manner as to cover the heat exchanger and conform to the configuration of the heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the dust collecting means is mounted in conformity to the configuration of the heat exchanger, the area can be enlarged, so that there is an advantage in that the dust-collecting capabilities can be improved, thereby making it possible to obtain high dust-collecting capabilities in the casing having the same height.

In addition, as described above, in accordance with the present invention, there are provided the heat exchanger disposed in the indoor unit; the plate-like dust collecting means disposed in such a manner as to cover the heat exchanger and arranged along the front air inlet, the upper air inlet, and the rear air inlet of the casing in which the heat exchanger is disposed, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other; and the guide piece disposed at a corner portion within the casing.

The plate-like dust collecting means, which is provided with the dust-collecting portions and the thin-walled portions for bending arranged in the form of strips, is mounted by being bent at the thin-walled portions in such a manner as to cover the heat exchanger, and is arranged along the front air inlet, the upper air inlet, and the rear air inlet of the casing by being guided to a predetermined position by the guide piece. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the dust collecting means is mounted along the inner surface of the casing, the area can be enlarged, so that there is an advantage in that the dust-collecting capabilities can be improved, thereby making it possible to obtain high dust-collecting capabilities in the casing having the same height. Additionally, when the dust collecting means is mounted, the dust collecting means is guided to a predetermined position by the guide piece, so that there is an advantage in that the operation of mounting the dust collecting means is further facilitated.

In addition, as described above, in accordance with the present invention, there are provided the heat exchanger disposed in the indoor unit; the plate-like dust collecting means disposed in such a manner as to cover the heat exchanger and arranged along the front air inlet, the upper air inlet, and the rear air inlet of the casing in which the heat exchanger is disposed, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other; and the guide rail provided in the casing for disposing the dust collecting means at a predetermined position by engaging an end portion of the dust collecting means.

The plate-like dust collecting means, which is provided with the dust-collecting portions and the thin-walled portions for bending arranged in the form of strips, is mounted by being bent at the thin-walled portions in such a manner as to cover the heat exchanger, and is arranged along the front air inlet, the upper air inlet, and the rear air inlet of the casing. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the dust collecting means is mounted along the inner surface of the casing, the area can be enlarged, so that there is an advantage in that the dust-collecting capabilities can be improved, thereby making it possible to obtain high dust-collecting capabilities in the casing having the same height. Additionally, when the dust collecting means is mounted, the dust collecting means is guided to a predetermined position by the guide rail, so that there is an advantage in that the operation of mounting the dust collecting means is further facilitated.

In addition, as described above, in accordance with the present invention, there are provided the heat exchanger disposed in the indoor unit; the plate-like dust collecting means disposed in such a manner as to cover the heat exchanger and conform to the configuration of the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other; and the guide rail provided in the casing for disposing the dust collecting means at a predetermined position by engaging an end portion of the dust collecting means.

The plate-like dust collecting means, which is provided with the dust-collecting portions and the thin-walled portions for bending arranged in the form of strips, is disposed at a predetermined position by the guide rail provided in the casing, and is mounted by being bent at the thin-walled portions in such a manner as to cover the heat exchanger and conform to the configuration of the heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, when the dust collecting means is mounted, the dust collecting means is guided to a predetermined position by the guide rail, so that there is an advantage in that the operation of mounting the dust collecting means is further facilitated.

In addition, as described above, in accordance with the present invention, there are provided the heat exchanger disposed in the indoor unit; and the plate-like dust collecting means disposed in such a manner as to cover the heat exchanger and arranged along the front air inlet, the upper air inlet, and the rear air inlet of the casing in which the heat exchanger is disposed, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other, the thin-walled portions being disposed at positions corresponding to corner portions within the casing.

The plate-like dust collecting means, which is provided with the dust-collecting portions and the thin-walled portions for bending arranged in the form of strips, is mounted by being bent at the thin-walled portions disposed at positions corresponding to corner portions within the casing, in such a manner as to cover the heat exchanger, and is arranged along the front air inlet, the upper air inlet, and the rear air inlet of the casing. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the dust collecting means can be mounted along the inner surface of the casing, the area can be enlarged, so that there is an advantage in that the dust-collecting capabilities can be improved, thereby making it possible to obtain high dust-collecting capabilities in the casing having the same height.

Additionally, since the thin-walled portions of the dust collecting means are respectively disposed at corner portions within the casing, there is an advantage in that high dust-collecting capabilities can be obtained.

In addition, as described above, in accordance with the present invention, there are provided the heat exchanger disposed in the indoor unit; and the plate-like dust collecting means disposed in such a manner as to cover the heat exchanger and conform to the configuration of the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other, the thin-walled portions being disposed at positions corresponding to bent corner portions in the configuration of the heat exchanger.

The plate-like dust collecting means, which is provided with the dust-collecting portions and the thin-walled portions for bending arranged in the form of strips, is mounted by being bent at the thin-walled portions disposed at positions corresponding to bent corner portions in the configuration of the heat exchanger, in such a manner as to cover the heat exchanger and conform to the configuration of the heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated.

Furthermore, since the thin-walled portions of the dust collecting means are disposed at positions corresponding to bent corner portions in the configuration of the heat exchanger, there is an advantage in that high dust-collecting capabilities can be obtained.

In addition, as described above, in accordance with the present invention, there are provided the heat exchanger comprising the front heat exchanger having an upper edge portion and a lower edge portion respectively formed in a receding manner and the rear heat exchanger disposed on the rear side of the front heat exchanger; and the plate-like dust collecting means disposed in such a manner as to cover the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other.

The plate-like dust collecting means, which is provided with the dust-collecting portions and the thin-walled portions for bending arranged in the form of strips, is mounted by being bent at the thin-walled portions in such a manner as to cover the heat exchanger. In addition, heat exchange is effected by the heat exchanging comprised of the front heat exchanger and the rear heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated. Additionally, there is an advantage of improving the dust-collecting efficiency.

In addition, as described above, in accordance with the present invention, there are provided the heat exchanger comprising the front heat exchanger having an upper edge portion and a lower edge portion respectively formed in a receding manner and the rear heat exchanger disposed on the rear side of the front heat exchanger; and the plate-like dust collecting means disposed in such a manner as to cover the heat exchanger including at least a half of the rear heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other.

The plate-like dust collecting means, which is provided with the dust-collecting portions and the thin-walled portions for bending arranged in the form of strips, is mounted by being bent at the thin-walled portions in such a manner as to cover the heat exchanger. In addition, heat exchange is effected by the heat exchanging comprised of the front heat exchanger and the rear heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated. Additionally, there is an advantage of improving the dust-collecting efficiency by virtue of the dust collecting means for covering the heat exchanger including at least a half of the rear heat exchanger.

In addition, as described above, in accordance with the present invention, there are provided the heat exchanger comprising the front heat exchanger having an upper edge portion and a lower edge portion respectively formed in a receding manner and the rear heat exchanger disposed on the rear side of the front heat exchanger; the plate-like dust collecting means disposed in such a manner as to cover the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other; and the air cleaning/dust collecting means disposed at a position corresponding to the upper edge portion of the heat exchanger.

The plate-like dust collecting means, which is provided with the dust-collecting portions and the thin-walled portions for bending arranged in the form of strips, is mounted by being bent at the thin-walled portions in such a manner as to cover the heat exchanger. In addition, heat exchange is effected by the heat exchanging comprised of the front heat exchanger and the rear heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated. Additionally, there is an advantage of improving the dust-collecting efficiency by virtue of the air cleaning/dust collecting means and the dust collecting means.

In addition, as described above, in accordance with the present invention, there are provided the heat exchanger comprising the front heat exchanger having an upper edge portion and a lower edge portion respectively formed in a receding manner and the rear heat exchanger disposed on the rear side of the front heat exchanger; the plate-like dust collecting means disposed in such a manner as to cover the heat exchanger, the dust collecting means being provided with the net-like dust-collecting portions having a dust-collecting function and with the thin-walled portions for bending which are provided in the form of strips, have their longitudinal directions arranged horizontally, and are disposed in parallel in spaced-apart relation to each other; and the air cleaning/dust collecting means disposed either between the front panel and the dust collecting means or between the dust collecting means and the front heat exchanger.

The plate-like dust collecting means, which is provided with the dust-collecting portions and the thin-walled portions for bending arranged in the form of strips, is mounted by being bent at the thin-walled portions in such a manner as to cover the heat exchanger. In addition, heat exchange is effected by the heat exchanging comprised of the front heat exchanger and the rear heat exchanger. Accordingly, when the dust collecting means is mounted, the dust collecting means can be shaped into a configuration adapted to the shape of the heat exchanger by means of the thin-walled portions for bending. Consequently, there is an advantage in that the operation of mounting the dust collecting means in a predetermined position inside the casing is facilitated. Additionally, there is an advantage of improving the dust-collecting efficiency by virtue of the air cleaning/dust collecting means and the dust collecting means.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger, wherein fins of the front heat exchanger are bent at the bent connecting portion provided at a position close to an air inlet.

Consequently, it is possible to increase the heat exchanging area in the indoor unit having the same height, and improve the heat exchanging capacity. Therefore, there is an advantage in that high-performance heat exchanging capabilities can be obtained in a compact indoor unit whose height is low.

In addition, the heat exchanger is bent at the bent connecting portion provided at a position on the fins which is close to the air inlet, so that each opening formed at the position close to the air inlet becomes narrow. Hence, the sucked-in air is allowed to easily come into contact with the fins, so that it is possible to overcome the drawback of dew condensation occurring due to insufficient dehumidification because air is difficult to come into contact with the fins. Accordingly, there is an advantage in that it is possible to obtain high dehumidifying capabilities.

In addition, as described above, in accordance with the present invention, the front heat exchanger having an upper edge portion and a lower edge portion respectively formed in a receding manner is disposed in the indoor unit, and the rear heat exchanger separate from the front heat exchanger is disposed on the rear side of the front heat exchanger, wherein fins of the front heat exchanger are bent at the bent connecting portion provided at a position close to an air inlet, the heat exchanger having the junction which is formed as mutually opposing ends of the fins at the bent connecting portion approach each other.

Consequently, it is possible to increase the heat exchanging area in the indoor unit having the same height, and improve the heat exchanging capacity. Therefore, there is an advantage in that high-performance heat exchanging capabilities can be obtained in a compact indoor unit whose height is low.

In addition, the heat exchanger is bent at the bent connecting portion provided at a position on the fins which is close to the air inlet, and mutually opposing ends of the fins at the bent connecting portion approach each other to form the junction. For this reason, a gap between the opposing ends of the fins is reduced at the junction, thereby allowing the sucked-in air to easily come into contact with the fins. Accordingly, it is possible to overcome the drawback of dew condensation occurring due to insufficient dehumidification because air is difficult to come into contact with the fins. Hence, there is an advantage in that it is possible to obtain high dehumidifying capabilities.

What is claimed is:

1. A separate-type air conditioner comprising:
   a heat exchanger disposed in an indoor unit; and
   a plate-like dust collecting means disposed in such a manner as to cover said heat exchanger, said dust collecting means comprising net-like dust-collecting portions having a dust-collecting function, a frame for fixing the dust-collecting portions, and thin-walled portions for bending which are provided in the form of strips, have their longitudinal directions arranged horizontally, and are disposed in parallel in spaced-apart relation to each other, said thin-walled portions being provided on the frame;
   wherein said plate-like dust collecting means is arranged along a front air inlet, an upper air inlet, and a rear air inlet of a casing in which said heat exchanger is disposed, and said thin-walled portions are disposed at positions corresponding to corner portions within said casing.

2. A separate-type air conditioner according to claim 1, further comprising:
   a guide piece disposed at a corner portion within said casing.

3. A separate-type air conditioner according to claim 1, further comprising:
   a guide rail provided in said casing for disposing said dust collecting means at a predetermined position by engaging an end portion of said dust collecting means.

4. A separate-type air conditioner according to claim 1, wherein fins of said heat exchanger are bent at a bent connecting portion provided at a position close to an air inlet.

5. A separate-type air conditioner according to claim 1, wherein fins of said heat exchanger are bent at a bent connecting portion provided at a position close to an air inlet, said heat exchanger having a junction which is formed as mutually opposing ends of said fins at said bent connecting portion approach each other.

6. A separate-type air conditioner comprising:
   a heat exchanger disposed in an indoor unit; and
   a plate-like dust collecting means disposed in such a manner as to cover said heat exchanger, said dust collecting means comprising net-like dust-collecting portions having a dust-collecting function, a frame for fixing the dust collecting portions and thin-walled portions for bending which are provided in the form of portions, have their longitudinal directions arranged horizontally, and are disposed in parallel in spaced-apart relation to each other, said thin-walled portions being provided on the frame;
   wherein said plate-like dust collecting means conforms to a configuration of said heat exchanger, and said thin-walled portions are disposed at positions corresponding to bent corner portions in the configuration of said heat exchanger.

7. A separate-type air conditioner according to claim 6, further comprising:
   a guide rail provided in a casing for disposing said dust collecting means at a predetermined position by engaging an end portion of said dust collecting means.

8. A separate-type air conditioner according to any one of claims 1, 2, 3, 6 and 7, herein said heat exchanger comprises a front heat exchanger having an upper edge portion and a lower edge portion respectively formed in a receding manner and a rear heat exchanger disposed on a rear side of said front heat exchanger.

9. A separate-type air conditioner according to claim 8, wherein said dust collecting means covers said heat exchanger including at least a half of said rear heat exchanger.

10. A separate-type air conditioner according to claim 8, further comprising:

air cleaning/dust collecting means disposed at a position corresponding to the upper edge portion of said front heat exchanger.

11. A separate-type air conditioner according to claim 8, further comprising:

air cleaning/dust collecting means disposed either between a front panel and said dust collecting means or between said dust collecting means and said front heat exchanger.

12. A separate-type air conditioner comprising:

a heat exchanger disposed in a casing; and a plate-like dust collecting means disposed between an inner surface of said casing and said heat exchanger, said plate-like dust collecting means comprising net-like dust-collecting portions, a frame for fixing the dust-collecting portions, and thin-walled portions which are thinner than said dust collecting portions for permitting a bending of said plate-like dust collecting means to a shape which conforms to a configuration of the heat exchanger.

* * * * *